United States Patent
Chen et al.

(10) Patent No.: US 10,688,841 B1
(45) Date of Patent: Jun. 23, 2020

(54) EXPANDING SENSOR DOMAIN COVERAGE USING DIFFERENTIAL ACTIVE SUSPENSION

(71) Applicant: Zoox, Inc., Menlo Park, CA (US)

(72) Inventors: Robert Chen, San Francisco, CA (US); Matthew Austin Terrel, Campbell, CA (US); Nivedita Chandrasekaran, Mountain View, CA (US); Johannes Edren, Belmont, CA (US); Joseph Funke, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 229 days.

(21) Appl. No.: 15/664,977

(22) Filed: Jul. 31, 2017

(51) Int. Cl.
*B60N 2/00* (2006.01)
*B60G 17/0165* (2006.01)
*B60G 17/019* (2006.01)

(52) U.S. Cl.
CPC ....... *B60G 17/0165* (2013.01); *B60G 17/019* (2013.01); *B60G 2400/0522* (2013.01); *B60G 2400/62* (2013.01); *B60G 2400/80* (2013.01); *B60G 2400/96* (2013.01); *B60G 2401/14* (2013.01); *B60G 2401/21* (2013.01); *B60G 2500/30* (2013.01); *B60G 2800/014* (2013.01)

(58) Field of Classification Search
CPC .......................... B60G 17/0165; B60G 17/019
See application file for complete search history.

(56) References Cited

U.S. PATENT DOCUMENTS

| | | | |
|---|---|---|---|
| 4,985,847 A * | 1/1991 | Shioya | G01C 3/10 701/36 |
| 7,466,339 B2 | 12/2008 | Usami | |
| 9,509,962 B2 | 11/2016 | Chundrlik, Jr. et al. | |
| 2007/0120334 A1* | 5/2007 | Holbrook | B60G 17/016 280/6.157 |
| 2010/0152897 A1* | 6/2010 | Muller | B25J 5/00 700/259 |
| 2012/0197439 A1* | 8/2012 | Wang | B25J 11/009 700/259 |
| 2013/0325244 A1* | 12/2013 | Wang | G05D 1/028 701/26 |
| 2014/0222287 A1* | 8/2014 | Popham | B60G 17/0165 701/37 |
| 2017/0130680 A1* | 5/2017 | Dudar | F02M 25/0809 |

* cited by examiner

*Primary Examiner* — Jess Whittington
(74) *Attorney, Agent, or Firm* — Lee & Hayes, P.C.

(57) ABSTRACT

A vehicle having a control system to utilize a movable suspension to increase sensor coverage. The control system can detect an object of interest that is partially, or completely, outside the field of view of one or more sensors on the vehicle. The system can then use the movable suspension to raise one portion of the vehicle and/or lower another portion of the vehicle to bring the object of interest at least partially into the field of view of the sensor, increasing the effective field of view of the sensor. When an object of interest is determined to be significant (e.g., a traffic or street sign), the system can attempt to bring the object of interest into view of the sensor by tilting the vehicle. The system can use different tilt rates and/or tilt angles depending on whether the vehicle is occupied or not.

20 Claims, 9 Drawing Sheets

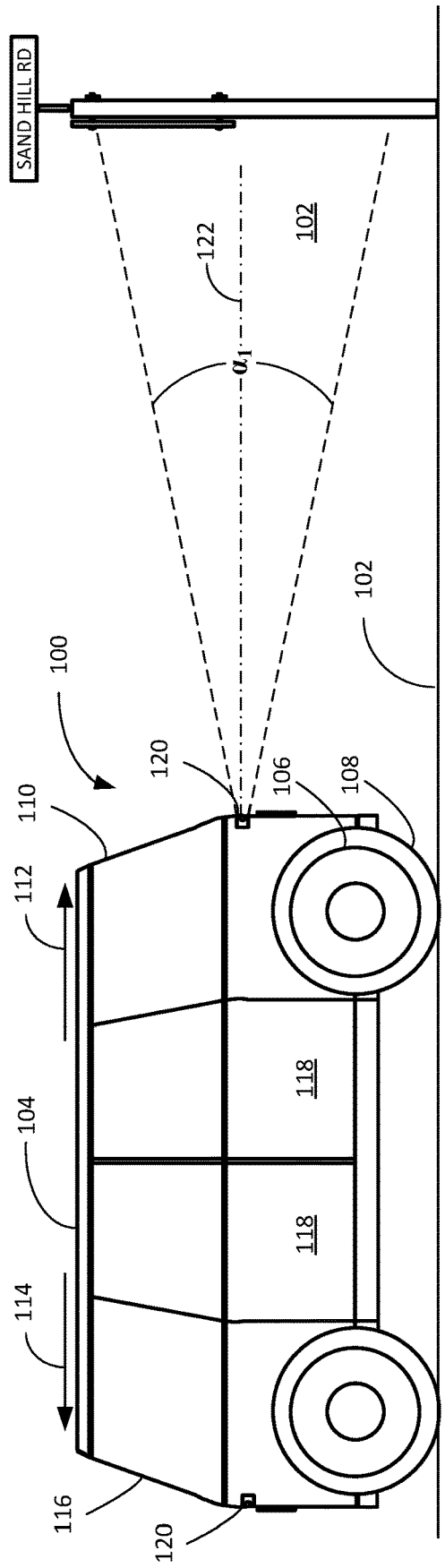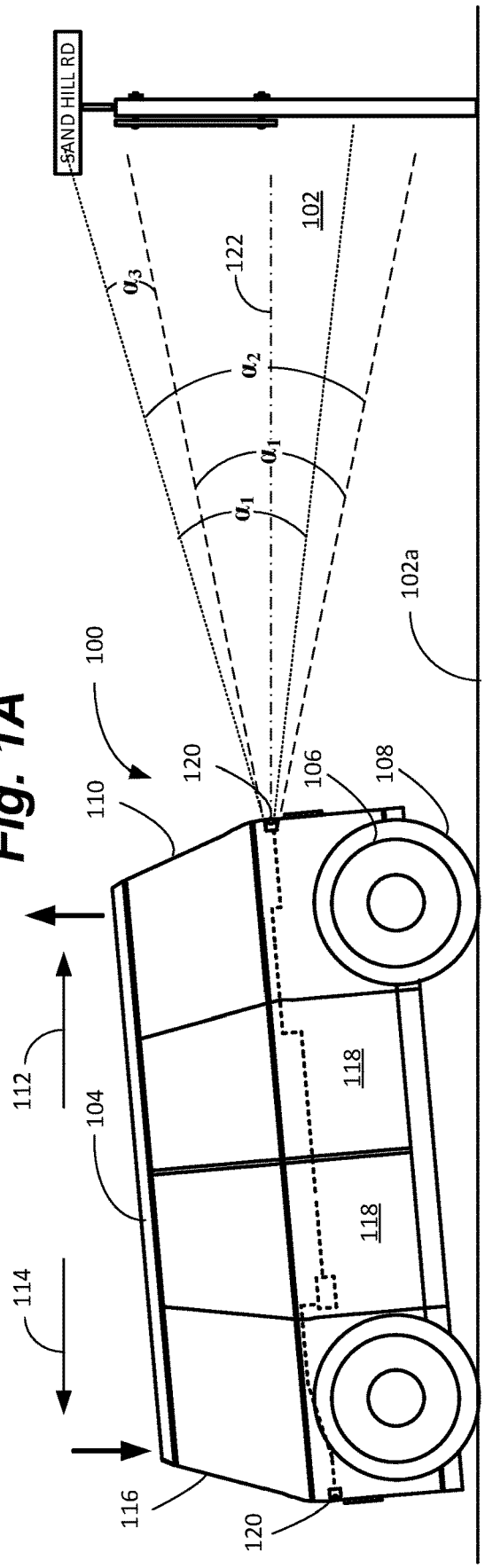

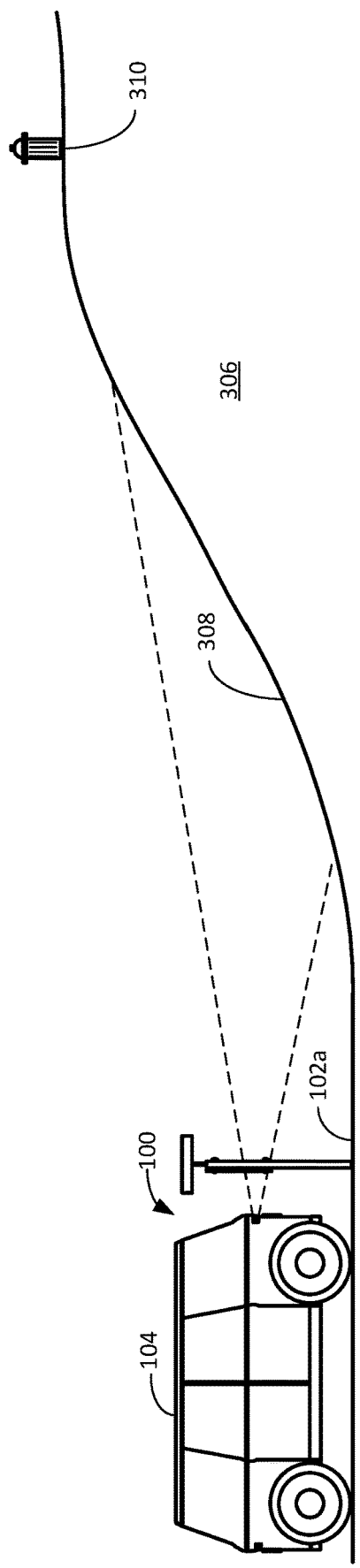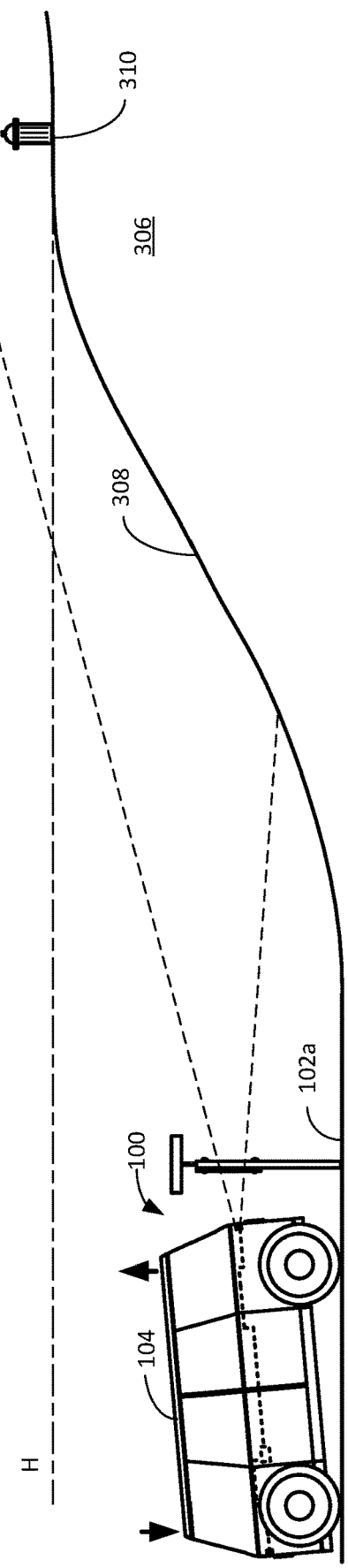
Fig. 3C
Fig. 3D

EXPANDING SENSOR DOMAIN COVERAGE USING DIFFERENTIAL ACTIVE SUSPENSION

BACKGROUND

Most modern vehicles rely, to some extent, on external sensors to detect the world around them. Modern vehicles use radio detection and ranging (RADAR) and vision systems, for example, to control the vehicle's cruise control and emergency braking systems, among other things. A user can select a desired following distance in the cruise control settings, for example, and the vehicle will automatically decelerate or brake when a slower moving vehicle is detected. Indeed, the National Highway Traffic Safety Administration (NHTSA) recently reported that more than 99 percent of new vehicles in the U.S. will have automatic emergency braking (AEB) standard by September, 2022.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIGS. 1A and 1B are side views of an example of a vehicle with a plurality of sensors and an adjustable suspension in a normal ride height pose (FIG. 1A) and a tilted mode (FIG. 1B), in accordance with some examples of the present disclosure.

FIGS. 3C and 3D are side views of an example of the vehicle with the plurality of sensors and the adjustable suspension shown in FIGS. 1B and 1B in the normal ride height pose (FIG. 3C) and a tilted mode (FIG. 3D) with respect to a hill, in accordance with some examples of the present disclosure.

DETAILED DESCRIPTION

Figure 2:
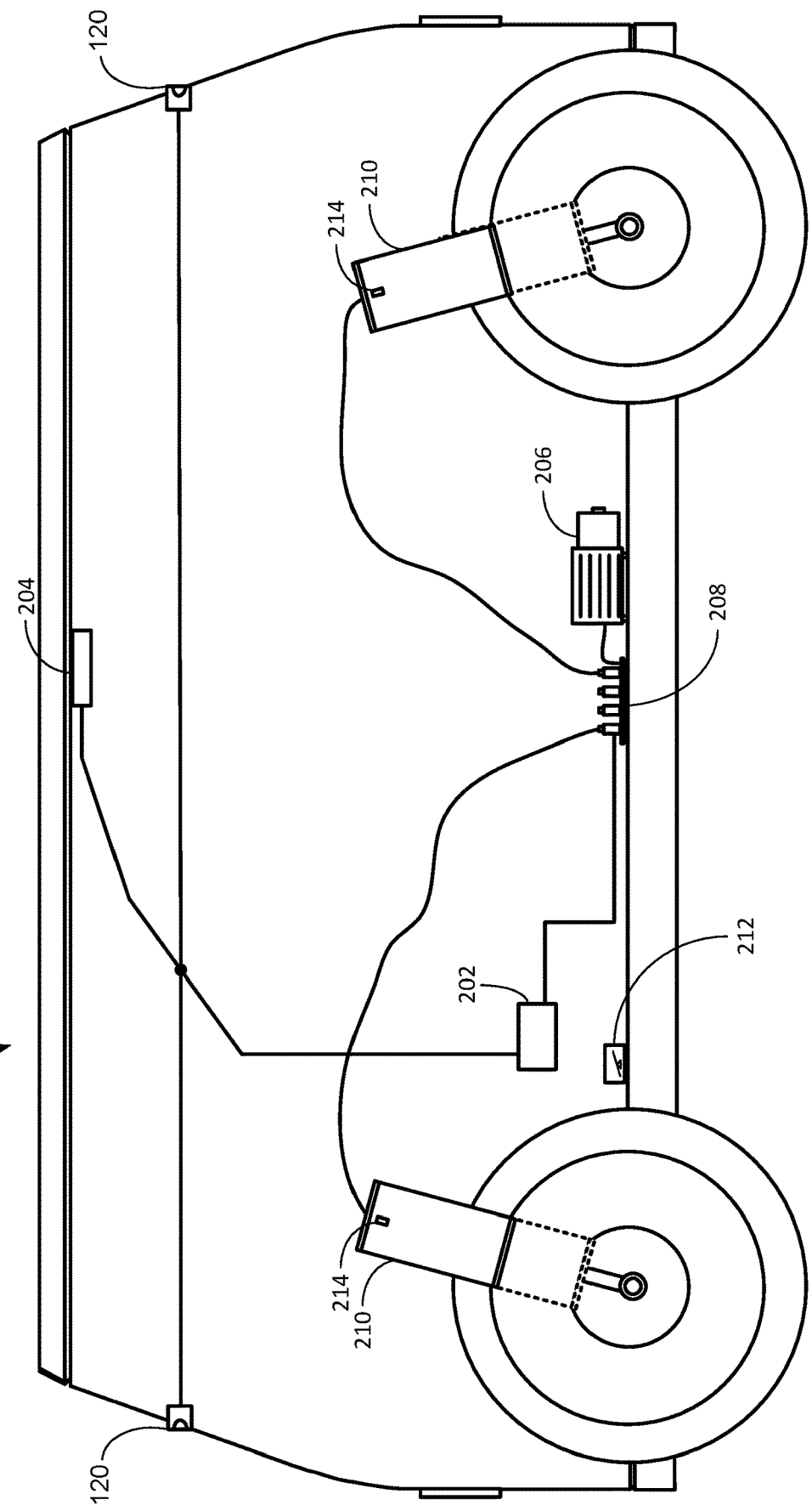
FIG. 2 is a side, cutaway view of the example of the vehicle in FIGS. 1A and 1B, in accordance with some examples of the present disclosure.

The field of view for most sensors is fixed and the sensors are often mounted in a fixed manner (e.g., they cannot tilt or rotate). A digital camera's field of view, for example, is dictating by the lens focal length and the image sensor size. Thus, at a particular working distance, the field of view of the camera is fixed. Similar factors dictate the field of view for other sensors. Light detection and ranging (LIDAR) sensors, for example, tend to have a narrow field of view simply to ensure sufficient point density on the return signals from external objects of interest.

In some case, the field of view can be artificially increased on cameras and other sensors using lenses. A wide-angle lens—or a lens with a shorter focal length than a standard lens, for example—can increase the field of view of a camera over a standard lens. Unfortunately, the wide-angle lens can also create one or more types of distortion (e.g. barrel distortion, achromatic aberrations, etc.), which can make objects of interest appear to diverge from the camera more severely. Thus, it may be desirable to mechanically increase the effective field of view of a camera, or other sensor, by tilting or panning, for example, rather than increasing the field of view optically using a lens. This can maintain the accuracy of the sensor data, among other things.

The effective field of view can also be increased on cameras and sensors by mounting them on movable mounts. Cameras can be mounted on gimbals, for example, that enable the camera to be rotated about two or three axes. On an autonomous vehicle, which may have tens or hundreds of sensors, however, this may not be practical. Each gimbal mount requires at least two motors and two controllers (e.g., in the two-axis example), each of which increases cost, weight, maintenance, and complexity. Additionally, various algorithms may use very finely calibrated positions and/or orientations of sensors (e.g. cameras, LIDAR, etc.) relative to a system to localize the system in an environment, recreate geometries of an environment, etc. Any motion of such devices relative to the system (e.g. the vehicle) would not only add complexity to such algorithms, but may yield errors due to altering the calibration.

To this end, examples of the present disclosure are generally directed to systems and methods for determining when an object of interest is partially, or completely, out of the field of view of a sensor on a vehicle. In this case, the vehicle can be tilted using an adjustable suspension to bring the object of interest into view of the desired sensor. A portion of a stop sign, or other traffic sign, for example, may be partially detected in a camera, but with a portion of the sign "cut off"—i.e., partially out of the field of view. The system can then tilt the vehicle to bring the sign fully (or at least more) into the field of view of the camera or another sensor.

In some examples, the systems may include an exterior sensor array including a plurality of exterior sensors associated with the vehicle. The exterior sensors may be oriented relative to the vehicle to obtain images (e.g. cameras including, but not limited to, depth cameras, RGB cameras, intensity cameras, IR cameras, etc.), RADAR, LIDAR, and other sensor data of the area in which the vehicle travels and potential objects of interest, signs, lane markings, or obstructions proximate the vehicle. The vehicle can also include one or more interior sensors to detect the presence of, and/or classify, various types of cargo (including passengers) in the vehicle. The interior sensor data and exterior sensor data (collectively, "vehicle sensor data") may be used by a vehicle control system to determine when an object of interest is partially, or fully, obscured—or, outside the field of view—from one or more sensors. The system can then tilt the vehicle in such a way as to bring the object of interest into the field of view of the camera, or another sensor. The system may use different rates of motion (tilt rate) and different limits of motion (tilt angle) depending on whether the vehicle is occupied or not.

Some examples of the systems and methods may include and/or use a reporting module in communication with a network. The reporting module may be configured to communicate data correlating a position and/or orientation of the vehicle with the vehicle sensor data related to detected objects of interest or obstructions via the network. Each vehicle may share the correlations with servers, vehicles, and/or or other computing devices in communication with the network, for example, to provide updates about detected objects of interest or obstructions and their corresponding positions and/or orientations. This may be used to supplement vehicle sensor data for one or more additional vehicles in communication with the vehicle and/or the network. A vehicle may tilt to read a street sign, for example, the details of which can be added to mapping data for use with other vehicles on the network.

In some examples, the systems and methods may include and/or access a receiver module in communication with a network and configured to receive updates relating to the correlation between the vehicle sensor data and location data. For example, vehicles such as those mentioned previously may communicate information to the vehicle including the receiver module and/or to a network in communication with the receiver module, so that the correlations associated with the vehicle may be updated. This may improve the accuracy of the correlations.

The techniques and systems described herein may be implemented in a number of ways. Example implementations are provided below with reference to the following figures.

FIGS. 1A and 1B show an example of an autonomous vehicle system 100 configured to travel across an area 102 (e.g., a road surface), for example, to transport people and/or cargo from a first location to a second location. For illustration, the system 100 can comprise a vehicle 104, which may be an autonomous vehicle configured to operate according to a Level 5 classification issued in 2016 by the U.S. National Highway Traffic Safety Administration. Level 5 includes a vehicle capable of performing all safety-critical functions for an entire trip, with the driver (or occupant) not being expected to control the vehicle at any time. In that case, since the vehicle 104 may be configured to control all functions from start to stop, including all parking functions, it may be unoccupied.

This is merely an example, however, and the systems and methods described herein may be incorporated into any vehicle with an adjustable suspension system, including those ranging from vehicles that are partially autonomously controlled to vehicles that are manually controlled (e.g., completely controlled by the driver). This can include vehicles that can be autonomously controlled without driver attention or assist during certain driving conditions, but such that they require driver attention and/or assistance during other driving conditions. The vehicle may be able to operate autonomously while operating on limited-access highways, for example, but not while operating on city streets in busy urban areas or during at least some parking functions, or vice-versa. As discussed below, in some cases, when occupied, the system may limit tilt rates and tilt angles for passenger comfort or based on passenger preferences.

The example vehicle 104 shown in FIGS. 1A and 1B is an automobile having four wheels 106 and respective tires 108 for each of the wheels 106. While shown generally as a sedan, the vehicle 104 could include other types and configurations of vehicles such as, for example, vans, sport utility vehicles, crossover vehicles, trucks, buses, agricultural vehicles, and construction vehicles. The vehicle 104 may be powered by one or more internal combustion engines, one or more batteries and electric motors, hydrogen fuel cells, or any combination thereof. In addition, although the example vehicle 104 has four wheels, the systems and methods described herein may be incorporated into vehicles having fewer or a greater number of wheels, tires, and/or tracks.

The example vehicle 104 has four-wheel steering and may operate generally with equal performance characteristics in all directions, for example, such that a first end 110 of the vehicle 104 is the front end of the vehicle 104 when traveling in a first direction 112, and such that the first end 110 becomes the rear end of the vehicle 104 when traveling in the opposite, second direction 114, as shown in FIGS. 1A and 1B. Similarly, a second end 116 of the vehicle 104 is the front end of the vehicle 104 when traveling in the second direction 114, and such that the second end 116 becomes the rear end of the vehicle 104 when traveling in the opposite, first direction 112. These example characteristics may facilitate greater maneuverability, for example, in small spaces or crowded environments, such as parking lots and urban areas. Thus, in some examples, the end 110, 116 that is facing the direction of travel at any given time, or the instantaneous "front" of the vehicle 104, can be referred to as the "leading end." Similarly, the end 110, 116 that is away from the direction of travel at any given time, or the instantaneous "rear" of the vehicle 104, can be referred to as the "trailing end."

The example vehicle 104 shown in FIGS. 1A and 1B includes one or more doors 118 on each side of the vehicle 104 for facilitating entry and exit of occupants and cargo to and from the vehicle 104. The systems and methods described herein may be incorporated into vehicles having fewer or a greater number of doors. In the example shown in FIGS. 1A and 1B, the system 100 can comprise one or more sensors 120, which may include, for example, one or more imagers, RADAR sensors, ultrasonic transducers, and/or LIDAR sensors mounted on the vehicle 104, though any other sensor capable of measuring environmental properties is contemplated (e.g. a temperature, pressure, particulate detection, etc.). The sensors 120 may be arranged in a predetermined pattern, for example, in order to provide a desired coverage of the area 102 proximate the vehicle 104. In some examples, as shown, the sensors 120 can be disposed in a pattern that enables approximately 360-degree coverage around the vehicle 104. This can enable the vehicle 104 to detect objects of interest regardless of which direction 112, 114 the vehicle 104 is traveling. This can also enable the system 100 to detect objects of interest approaching from the sides of the vehicle 104 (e.g., a pedestrian, a dog, or another animal, running into the street). Other patterns and arrangements of the sensors 120 are contemplated.

The imagers may be any known types of image sensors, cameras, and/or video cameras. The imagers may be high dynamic range (HDR) cameras, for example, to provide improved accuracy of the images. In some examples, the imagers may include one or more of light-sensitive cameras, range sensors, depth cameras, infrared cameras, tomography devices, RADAR, LIDAR, and/or ultra-sonic cameras. Other suitable types of imagers are contemplated. The cameras or other imagers may be analog or digital. The imagers may be selected to provide two-dimensional (2-D) image data, two and a half-dimensional (2.5d, or depth maps), and/or three-dimensional (3D) image data, image sequences, gray image data, and/or color image data. In some examples, the imagers may be selected to provide depth data, absorption data, and/or reflectance data.

As shown in FIGS. 1A and 1B, the example sensors 120 can be mounted to a portion of the vehicle 104 that provides a line-of-site view of a portion of the area 102 around the vehicle 104, with at least a portion of the sensors 120 pointed in the direction of travel. The sensors 120 may be mounted at a location generally corresponding to the upper edge of the windshield 131, for example, either outside or inside the windshield. In examples in which the sensors 120 are mounted inside the windshield, any distortion of the images resulting from the windshield may be corrected, for example, via lenses or algorithms configured to correct the image data. If the vehicle 104 includes two windshields due to being bi-directional (like the example vehicle 104), a set of sensors 120 could be mounted at each end 110, 116 of the vehicle 104.

According to some examples, one or more of the sensors 120 may be mounted in fixed manner, for example, so that images or other data from the sensors 120 are taken from a constant orientation relative to the vehicle 104. In such examples, the images are always taken from the same angle relative to the vehicle 104 in both the vertical and lateral directions. In other words, the field of view of the sensors 120 is fixed and the vehicle 104 is generally at a relatively constant orientation relative to the ground plane (e.g., "the normal ride height pose"). As a result, the "as installed" portion of an environment visible to the sensors 120 would normally be fixed. In conventional vehicles having this type of configuration, if an object of interest is slightly outside the field of view of the sensors, little can be done to remedy the situation.

To this end, as shown in FIGS. 1A and 1B, the system 100 described herein can tilt all or a portion of the vehicle to increase the visibility of the sensors 120, thus artificially increasing the effective field of view of the sensors 120. As shown in FIG. 1A, in the normal ride height pose, a sensor 120 mounted horizontally on the vehicle 104 may have a relatively symmetrical field of view above and below the horizontal axis 122. The field of view can obviously vary widely depending on the type of sensor. Regardless, as shown in FIG. 1B, the effective field of view (i.e. the total visibility the sensor has of a surrounding environment) of the sensor can essentially be increased by tilting the vehicle 104 and thus, the sensor 120.

As shown in FIG. 1A, the sensor 120 can have a field of view, illustrated as angle $\alpha_1$. In this example, the sensor 120 is shown mounted substantially horizontally relative to the ground, and thus, $\alpha_1$ is substantially symmetrical about the horizontal axis 122. This configuration may be useful for a camera, for example, or another forward-looking sensor. Ground sensing RADAR, on the other hand, may be pointed downward and other sensors may be pointed upward. Regardless of their installed configuration, $\alpha_1$ can be rotated relative to the horizontal axis 122 for any sensor 120 by tilting the vehicle 104 (e.g., raising and/or lowering various portions of the vehicle 104).

As shown in FIG. 1B, therefore, by tilting the vehicle 104 up on the first end 110 and/or down on the second end 116, for example, al can be rotated upward. As shown, though the field of view of the sensor 120 remains the same in either the horizontal or tilted position, the portions of the environment visible to the sensor 120 changes. This creates an effective field of view for the sensor 120 having a larger viewing angle $\alpha_2$, effectively increasing the field of view of the sensor 120 by tilting the vehicle through a tilt angle, $\alpha_3$. Thus, the effective field of view of the sensor 120 (i.e. the combined visibility of the sensor 120 in in both positions) becomes the larger combined angle, $\alpha_2$. Of course, the field of view could be further widened in an opposite direction by lowering the first end 110 of the vehicle 104 and/or raising the second end 116 of the vehicle 104.

It should also be noted that, while the vehicle 104 is shown in FIGS. 1A and 1B as tilting longitudinally, the vehicle 104 can also be tilted side-to-side by raising one side of the vehicle 104 (e.g., the passenger side) and lowering the other (e.g., the driver's side). Indeed, the suspension system may include individual control for each corner of the vehicle 104, enabling the vehicle 104 to be tilted longitudinally, laterally, and combinations thereof to enable, for example, tilting along a diagonal axis, among other things. Thus, while the tilt angle, $\alpha_3$, in this case is shown as a single angle (e.g., pitch), in reality, $\alpha_3$ may include at least two angles (e.g., pitch and roll). Indeed, in vehicles with rear-wheel steering, for example, $\alpha_3$ may include at least three angles (e.g., pitch, roll, and yaw). Thus, the representation of $\alpha_3$ in FIG. 1B is not intended to be limiting, but rather to provide a simple and clear example for explanation purposes.

In some examples, the vehicle 104 may perform multiple movements to further increase an effective field of view of one or more sensors. Thus, by tilting the vehicle 104 up on the first end 110 and/or down on the second end 116 and then tilting the vehicle 104 down on the first end 110 and/or up on the second end 116, the sensor 120 can perform a scan of the area 102 over a much wider effective field of view. Indeed, the further a sensor (such as sensor 120) lies from an axis of rotation, the greater the increase in effective field of view created by tilting the vehicle 104. This may be useful, for example, when a vehicle 104 is being used to create or supplement map data, for example, or when items of interest are located both above (e.g., a street sign) and below (e.g., road construction) the installed field of view, $\alpha_1$, in the same location.

As shown in FIG. 2, the system 100 can also include a suspension control system 200 comprising a controller 202, one or more interior sensors 204, a pump/motor 206, a suspension control module 208, and a plurality of adjustable shock absorbers or struts (collectively, "shocks") 210. The controller 202 can be in communication with the interior sensors 204 to determine whether the vehicle 104 is occupied or not. As mentioned above, the system 100 may use different tilt rates and/or tilt angles depending on whether the vehicle 104 is occupied or empty. This may be to minimize passenger discomfort and reduce the likelihood of motion sickness, among other things.

To this end, in some examples, the suspension control system 200 can also include a tilt sensor 212. As the name implies, the tilt sensor 212 can provide tilt rate and/or tilt angle data to the controller 202 to enable the controller 202 and/or the suspension control module 208 to move the vehicle 104 from one pose (i.e. position and orientation) to another—e.g., nose up, the normal ride height pose, nose down, etc. The tilt sensor 212 can also enable the controller 202 to maintain appropriate limits on tilt rate and tilt angle depending on whether the vehicle 104 is occupied or not and to prevent damage to the vehicle's suspension, among other things. The tilt sensor 212 can comprise, for example, a dedicated tilt sensor, a gyroscope, an accelerometer, or another inertial sensor. In some examples, a pose of the vehicle 104 may be calculated based at least in part on any one or more sensors 120. For example, various localization algorithms, loop closure algorithms, visual-inertial odometry, Bayesian filters (such as Kalman filters, and the like), bundle adjustment, etc. may use sensor output from one or more cameras, LIDARs, or RADARs to provide a prediction of a position and/or orientation (together a pose) of a system (e.g. the vehicle 104).

In some examples, the suspension control system 200—e.g., the shocks 210 (shown) or the suspension of the vehicle 104 itself—can include one or more position sensors 214. As the name implies, the position sensors 214 can indicate the current position of the shocks 210 (from which the position of the suspension can be derived) or the current position of the suspension directly. The position sensors 214 can include, for example, potentiometers, linear position sensors, rotary encoders, or position transducers.

As discussed below in more detail with reference to FIG. 5, the controller 202 can receive inputs from the sensors 120, the suspension control module 208, the tilt sensor 212, the position sensors 214, and/or various other modules in the vehicle (e.g., the perception system 532) to determine when tilting the vehicle 104 to increase the field of view of one or more sensors 120 would be useful. If a camera on the vehicle 104 can see a stop sign, for example, but not the street sign on top of the stop sign, it may be useful to tilt the vehicle 104 up on the first end 110 and/or down on the second end 116 in an attempt to bring the street sign into view. In other words, the system 100 may be able to "see" the street sign with one sensor 120 (e.g., a RADAR sensor), but not another (e.g., a camera). Or, the system 100 may assume, for example, that all stops signs have street signs mounted on top of them. If a camera can see the stop sign but not the street sign, therefore, the system 100 can assume that some adjustment to the suspension is necessary.

In some examples, data regarding object positions and/or orientations in an environment may be available as map data and/or indicated on a map accessible by the vehicle 104. In such examples, data of object positions and/or orientations may be provided via several mechanisms, such as users providing the data, additional vehicles with more sensors and/or sensors having wider fields of view providing the data, or the like. In various examples, various computer vision and/or machine learning algorithms may be employed to detect partial observable objects (e.g., objects that are partially out of view of at least one sensor 120). In some examples, an object may be detected in one type of sensor (e.g., LIDAR) and one or more systems (or a user) may desire visibility of the object in a second type of sensor (e.g., a camera).

This may be useful when new streets are built, for example, that have not yet been added to the map data used by the vehicle 104 for navigation. Similarly, if the vehicle approaches a large downward sloping hill, for example, the street, markings, signs, and other features may "drop away" out of view of a forward-facing camera making navigation difficult. In this case, the vehicle 104 may lower the first end 110 and raise the second end 116 to bring the street back into view of the camera.

The controller 202 may also receive signals from one or more interior sensors 204. The interior sensors 204 can comprise one or more sensors capable of detecting the presence of passengers and or cargo. The interior sensors 204 can comprise, for example, ultrasonic, RADAR, or LIDAR motion detectors, seat weight sensors, seat belt sensors, or light beams, among other things. In some examples, the controller 202 can also include a cargo classification system capable of determining what is in the vehicle 104 and setting the tilt rate and tilt angles accordingly. additional information regarding appropriate cargo classification systems can be found in U.S. patent application Ser. No. 15/437,677, filed Feb. 21, 2017, entitled, "Occupant Aware Braking System," which is hereby incorporated by reference. Regardless, the tilt rate and/or tilt angles can include at least two different settings—empty and occupied—and in some cases, multiple "occupied" settings based on cargo classification. As non-limiting examples, such classification may be, for example, an adult, a child, a package, an animal, a cake, luggage, or the like.

In some examples, the shocks 210 can comprise hydraulic, pneumatic, or electric shocks that can be adjusted between a retracted position (dotted lines) and an extended position (solid lines). The shocks 210 can enable the vehicle 104 to tilt either end 110, 116 up or down, the entire vehicle 104 to squat or raise, or the vehicle 104 to be tilted from side to side. In some examples, the normal ride height pose can be between the extended position and the retracted position in which the vehicle 104 is substantially level. This can enable the vehicle 104 to be tilted up or down at either, or both, ends 110, 116, to be tilted from side to side, or to be tilted in any direction, including, but not limited to, diagonally.

In some examples, the system 100 can also include a pump 206 and a suspension control module 208. The pump 206 can comprise an air compressor, for example, or a hydraulic pump to provide pressure to the suspension control system 200 (if applicable). The suspension control module 208 can comprise a microprocessor and, in some cases, a plurality of solenoids to control the flow of pressure into, and out of, the shocks 210. In some examples, the suspension control system 200 can use a front solenoid and a rear solenoid to enable the vehicle 104 to be tilted up and down at either end 110, 116. In other examples, the suspension control system 200 can include individual solenoid for each shock 210 with at least one solenoid for each corner of the vehicle 104. In some examples, the suspension control system 200 can include two solenoids for each shock 210, one to raise the shock 210 and another to lower the shock 210.

Regardless, the controller 202 can activate the plurality of solenoids on the suspension control module 208 to change the attitude of the vehicle 104, as mentioned above. In some examples, the controller 202 can use pulse width modulation, or other techniques, to control the rate of movement of the vehicle 104. When the vehicle 104 is occupied, for example, the controller 202 may command movement of the vehicle 104 at a slower rate than when the vehicle 104 is empty to minimize passenger discomfort. When the vehicle 104 is unoccupied, on the other hand, the controller 202 can command movement at a higher rate to decrease the time required to attain a particular pose (e.g., nose up, nose down, etc.). As will be described in detail with reference to FIG. 5 below, in some examples, the controller 202 may receive or determine additional data indicating various parameters of a vehicle 104 (e.g. a velocity, acceleration, etc.) in addition to a trajectory of the vehicle 104 ("trajectory data"), and use such parameters and trajectory to blend control of any shock 210 so as to maximize a change in orientation of the vehicle 104, while minimizing any discomfort to passengers. Of course, in all cases, the movement of the vehicle 104 can be controlled to the extent necessary to prevent bottoming of the suspension and/or damage to the vehicle 104.

In some examples, the shocks 210 can comprise linear actuators or can include servo motors, screw drives, or other components to enable the shocks 210 to be repositioned electrically. In this configuration, the pump 206 and/or suspension control module 208 may be obviated. In some examples, the suspension control module 208 can simply command one or more servo motors to move to a particular position or to move a predetermined number of steps in a particular direction.

As mentioned above, in some examples, the movement of the suspension control system 200 can be based on the detection of an "object of interest" that is partially, or completely, outside the field of view of, or obscured from, one or more sensors 120 on the vehicle 104. As used herein, an object of interest can be almost any object of interest that may be useful for navigation, passenger comfort, map building, etc. An object of interest can comprise, for example, a street sign (e.g., street name), traffic sign (e.g., stop, yield, speed limit, etc.), traffic cones, construction sites, potholes, curbs, driveways and entrances, the horizon, and street markings (e.g., center and edge lines), among other things. When the vehicle 104 approaches the top or bottom of a steep hill, for example, the horizon, street markings, and other objects of interest may be above (e.g., the vehicle 104 is at the bottom of the hill) or below (e.g., the vehicle 104 is cresting the hill) the field of view of a camera, for example, making navigation difficult.

In some examples, objects of interest may also include a subset of "navigational" objects. As the name implies, navigational objects are those objects that are linked to whether, or how, the vehicle 104 can continue. This can include, for example and not limitation, dynamic objects that have changing states such as traffic lights, digital construction or traffic signs, and flashing lights, and other vehicles. The vehicle 104 may not be able to safely continue, for example, until a traffic light can be brought into the field of view of at least one relevant sensor to determine when the traffic light turns green. Similarly, if a construction sign indicates a lane closure, for example, the vehicle 104 may need to perform a lane change to continue in a particular direction.

If a navigational object cannot be brought into view simply by assuming a vehicle pose, for example, the vehicle 104 may adopt alternative strategies. One alternative strategy is for the vehicle 104 to maneuver slightly to enable the navigational object to be brought into view. The vehicle 104 may be able to back up slightly (assuming no vehicles are close behind the vehicle 104) to bring the navigational object into view. In other examples, the alternative strategy may include sending a data request to the central control requesting teleoperation (i.e., manual control from a remotely located worker or controller), or similar. Thus, a worker at the central control may be able to maneuver a manually controlled camera on the vehicle 104, for example, to bring the navigational object (e.g., a traffic light) into view. When the traffic light turns green, the worker can provide a manual signal to the vehicle 104 that it is safe to proceed, at which point the vehicle 104 returns to autonomous navigation.

Figure 3A:
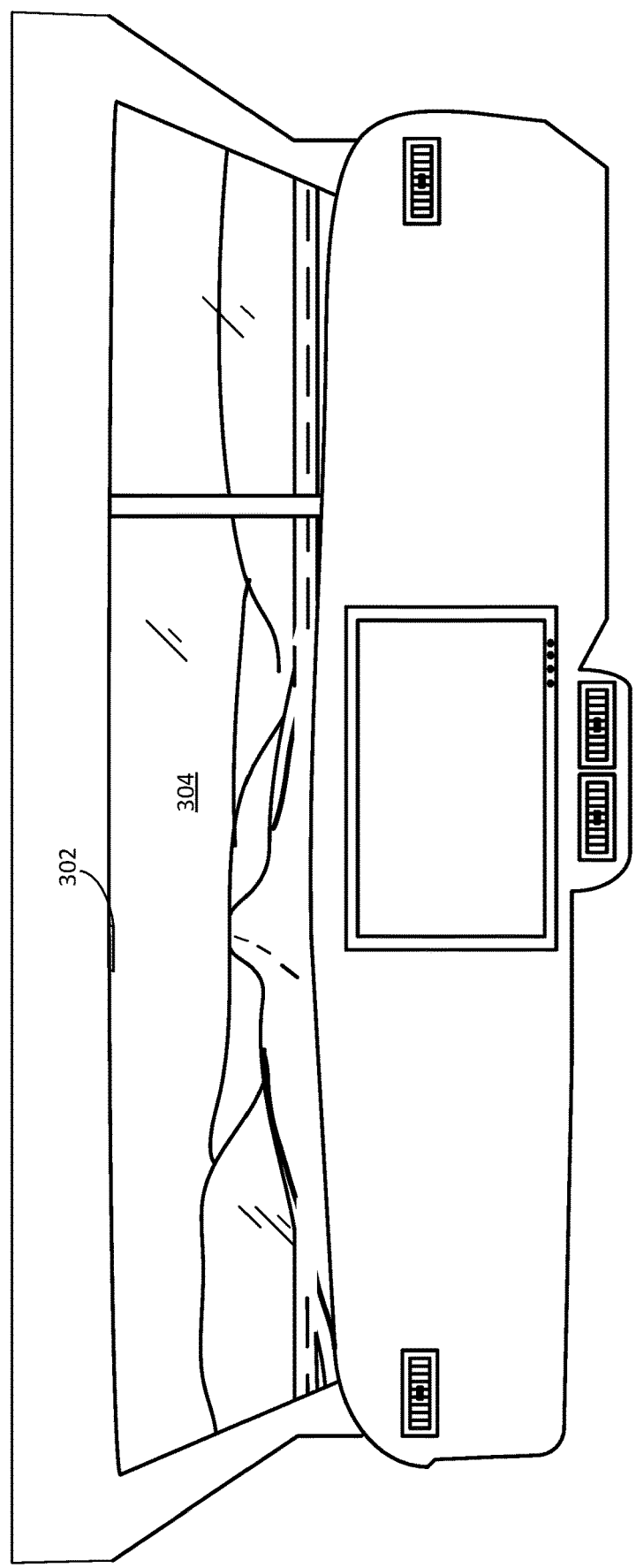
FIGS. 3A and 3B are outward views from the example of the vehicle with the plurality of sensors and the adjustable suspension shown in FIGS. 1A and 1B in the normal ride height pose (FIG. 3A) and a tilted mode (FIG. 3B), in accordance with some examples of the present disclosure.
Figure 3B:
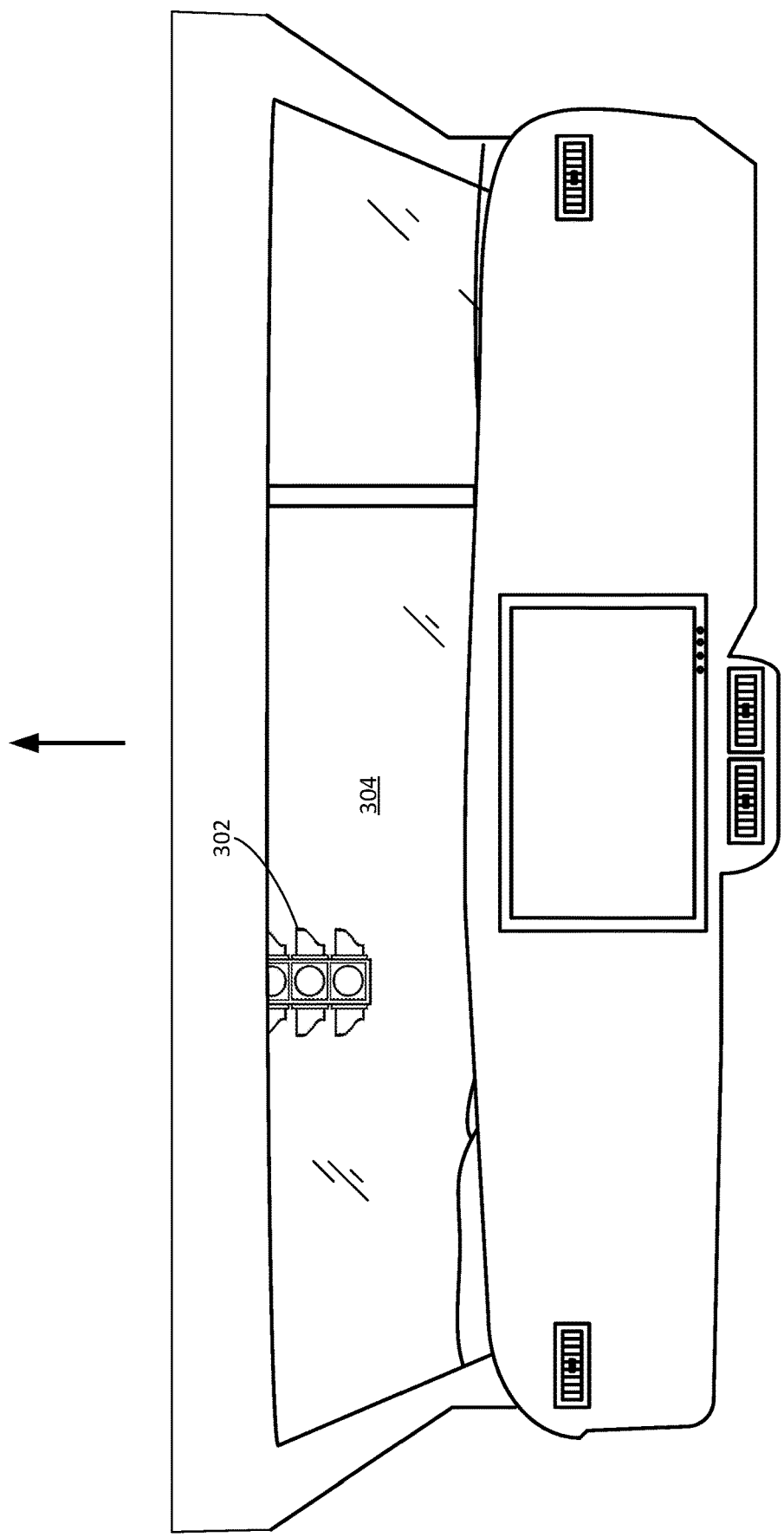

As shown in FIG. 3A, an object of interest can comprise, for example, a traffic light 302. In FIGS. 3A and 3B, the traffic light 302 is shown from the inside of the vehicle 104 as if one was looking out the windshield 304. In reality, this would likely be from the viewpoint of a particular sensor 120, not from the viewpoint of the passengers, though a dash mounted sensor 120 might have a similar viewpoint.

Regardless, the controller 202 can detect that the traffic light 302 is partially obscured from, or outside, the field of view of the sensor 120 (taken to be the view from the windshield 304 in this case). The controller 202 can use image recognition software, edge detection, machine learning, or other image processing techniques to (1) identify an object of interest and (2) determine that it is at least partially out of view of one or more sensors 120. In some examples, a map comprising locations of various objects may be provided to the vehicle 104. In such an example, a difference between detected objects and expected objects may indicate to the vehicle 104 that the object may not be visible to one or more of the sensors 120. This can include, for example, detecting an object of interest in a first sensor of the one or more sensors 120, but not another, for example, or detecting a portion of the object of interest (e.g., a top or side edge).

As shown in FIG. 3B, in this example, the first end 110 of the vehicle 104 can be raised and/or the second end 116 of the vehicle 104 lowered to bring the traffic light 302 into view. Of course, in some examples, object of interest detection software may be able to identify the traffic light 302 with only a portion of the traffic light 302 in view. The controller 202 may be able to determine from the bottom half of the traffic light 302 that the object of interest is octagonal and red. This, in turn, can be used to determine that the object of interest is a traffic light 302—e.g., as opposed to a yield or speed limit sign. Thus, while in some cases, the tilt of the vehicle 104 may not be sufficient to bring the traffic light 302 fully into view, it can nonetheless bring the traffic light 302 sufficiently into view for recognition.

As shown in FIGS. 3C and 3D, the movement of the vehicle 104 may also be used to see over topographical, or other, obstacles. As shown, if the vehicle 104 is sitting at a traffic light 302 at the bottom of a hill 306, for example, the field of view of a sensor 120 may include only the road surface 308. In other words, as shown in FIG. 3C, when the vehicle 104 is in the normal ride height pose (e.g., substantially horizontal to the ground 102a), one or more of the sensors 120 may be pointed at the ground 102a, such that the sensor 120 cannot see the horizon, H, or other features in front of the vehicle 104. As shown in FIG. 3D, therefore, it may be useful to tilt the vehicle 104 to a pose that enables the sensor 120 to see the horizon, for reference, street markings or signs, and other features other than just the road surface 308. Thus, tilting the vehicle 104 up in the front and/or down in the back can bring the horizon into view and perhaps objects at the top of the hill 306 (e.g., a fire hydrant 310, stop light, or another feature).

Of course, the opposite is also true. In other words, of the vehicle 104 is sitting at the top of a hill, the sensors 120 may only be able to see sky, with the road surface 308 dropping out of view. This may not be very useful to navigation, where street signs and street markings may help the vehicle 104 to navigate and maintain its lane, among other things. In this situation, therefore, it may be useful to tilt the vehicle 104 down in the front and/or up in the back to bring the road surface 308 and other objects into view.

Figure 4A:
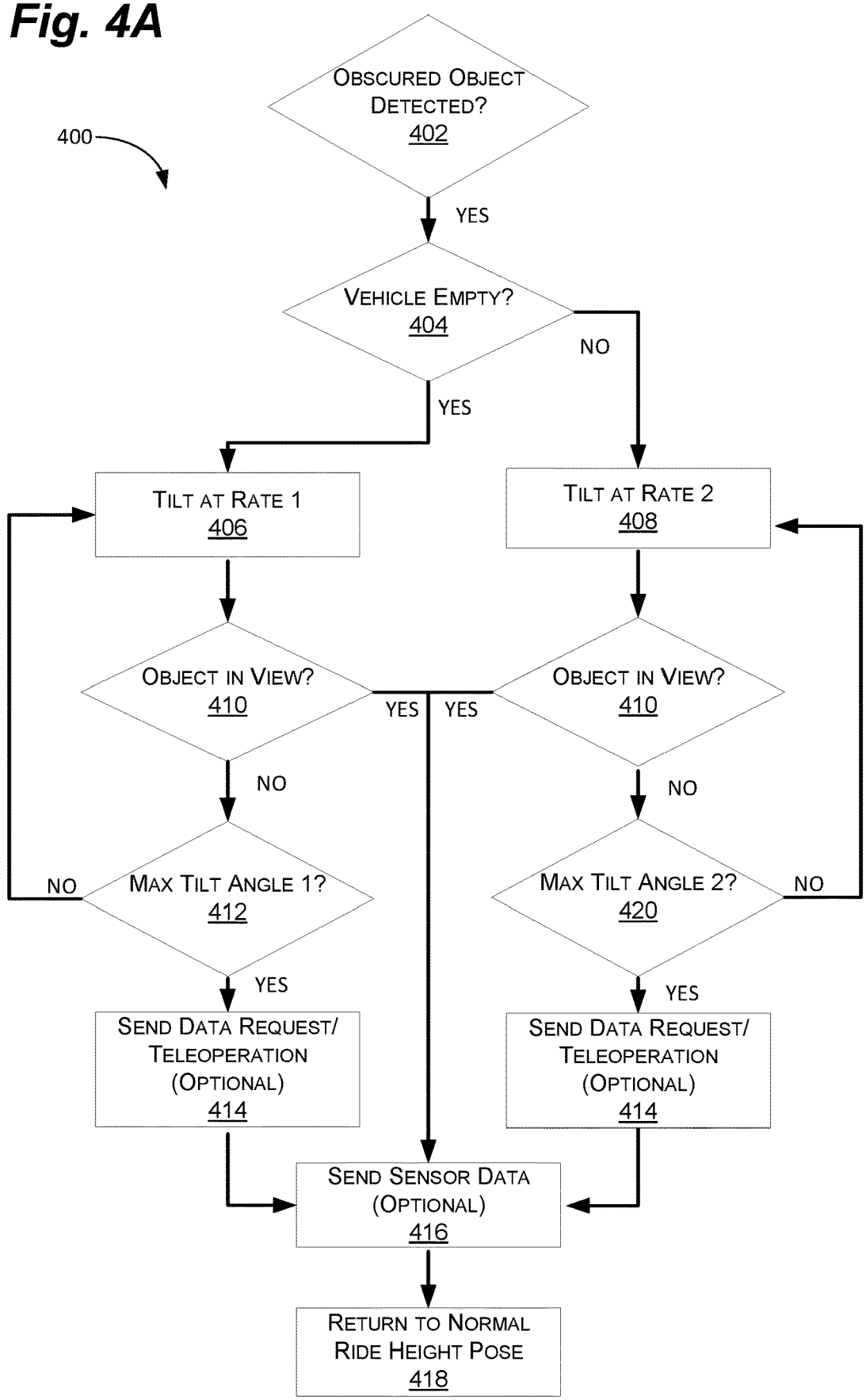
FIG. 4A is a flowchart depicting an example of a method for increasing the field of view of a sensor using a tilting vehicle suspension, in accordance with some examples of the present disclosure.

As shown in FIG. 4A, examples of the present disclosure can also comprise a method 400 for adjusting a vehicle's suspension to increase the field of view of one or more sensors on the vehicle 104. As discussed above, the vehicle 104 can include an adjustable suspension control system 200 to tilt, raise, squat, or otherwise move the body of the vehicle 104 on which one or more sensors 120 are mounted. In this manner, thought the individual sensors 120 can be rigidly mounted to a portion of the body of the vehicle 104, the sensors 120 can nonetheless be tilted, raised, and lowered to bring obscured objects of interest into view.

At 402, the controller 202 can determine that an object of interest is not fully visible (e.g. partially obscured, not visible, etc.) by at least one sensor 120 on the vehicle. As discussed above in FIGS. 3A and 3B, in some examples, the object of interest can be above the field of view of the sensor 120, like a street sign or stop sign. In other examples, the object of interest can be below the field of view of the sensor 120 like a pothole or road marking (e.g., a center line or edge line). In still other examples, the object of interest may be obscured because of the topography proximate to the vehicle 104. As mentioned above, If the vehicle 104 is on flat ground at the bottom of a large hill, for example, a forward-looking camera may be looking directly at the street surface, for example, and have no view of the horizon. This is not very useful if the vehicle's control systems are using the camera, for example, to stay in the same lane using the lane markings.

At 404, the controller 202 can determine whether the vehicle is empty or not. As mentioned above, the suspension control system 200 may include different settings depending on whether the vehicle 104 is empty, includes cargo or passengers, and/or the classification of the cargo. The suspension control system 200 may limit the rotation, or tilt, rate of the vehicle 104 when carrying passengers or cargo to minimize the passenger's sensation of movement and/or discomfort, for example, or to prevent cargo from falling off the seat onto the floor. The controller 202 may also limit the maximum tilt angle to something less than the vehicle's tilting limits (e.g., as dictated by the shocks 210 or the suspension) when occupied. Thus, the vehicle 104 may assume shallower (e.g., closer to level, less severe or angled) poses when occupied than when empty and may arrive at these poses more slowly.

In some examples, the suspension control system 200 may include at least two different tilt rates—a first rate for when the vehicle 104 is empty and a second rate for when the vehicle 104 has passengers or cargo—where the first rate is higher than the second rate. Similarly, the suspension control system 200 can include at least two tilt angles—a first tilt angle for when the vehicle 104 is empty and a second tilt angle for when the vehicle 104 has passengers or cargo—where the first tilt angle is higher (tilted at a greater angle) than the second tilt angle. When the vehicle 104 is empty, therefore, the suspension control system 200 is free to tilt the vehicle 104 to a greater angle, which further increases the change in viewing angle of the sensor 120. When the vehicle 104 is occupied, the tilt angle can be set to a smaller tilt angle to prevent passenger discomfort.

As discussed below, in some examples, a maximum tilt rate may be increased for occupied vehicles 104 by blending in control with vehicle parameters and/or trajectory data. As a non-limiting example of such, a tilting rate may be incorporated into a vehicle stop trajectory such that natural pitching of a vehicle 104 during a stop (e.g., as the brakes are applied, the vehicle 104 naturally pitches down in the front) is combined with the intentional tilting to provide a larger tilt angle or tilt rate while providing a negligible difference in ride feel to any passengers. Similarly, the natural pitch up of the front of the vehicle 104 under acceleration may be combined with the intentional tilting to provide a larger tilt angle or tilt rate.

At 406, if no passenger or cargo is detected, the vehicle 104 is free to tilt at "tilt rate 1," which can be a higher tilt rate than when the vehicle 104 is occupied. So, for example, the suspension control system 200 may lower the shocks 210 at the first end 110 and raise the shocks 210 at the second end 116 at the same time and/or at the maximum rate that can be generated. Indeed, when the vehicle 104 is unoccupied, the tilt rate may be limited only by the suspension control system 200, the vehicle 104, and any road topographies. In other words, in the case of a hydraulic suspension, the pump 206 may only be able to generate enough fluid to move the shocks 210 at a certain rate, for example, or the suspension control system 200 may limit the maximum rate to prevent suspension bottoming or other damaging effects.

At 408, if the vehicle 104 is occupied on the other hand, the suspension control system 200 can tilt the vehicle at tilt rate 2, which may be lower than tilt rate 1. This can reduce the motion felt by the passengers, for example, and/or prevent motion sickness, among other things. Tilt rate 2 can also prevent cargo from shifting, falling off the seat onto the floor, etc. In some examples, as mentioned above, rather than just having two tilt rates, the suspension control system 200 can include a cargo classification system such that multiple tilt angles or tilt rates may be specified depending on the cargo classification. In other words, a box of hammers is obviously less sensitive to tilting than a wedding cake. As such, the suspension control system 200 may provide for a higher tilt angle and/or tilt rate for the box of hammers than the wedding cake.

At 410, regardless of the tilt rate, the controller 202 can determine if the object of interest is now (sufficiently) in view of the sensor 120. This can include image recognition software being able to identify the object of interest in image data or the return signal to a RADAR or LIDAR sensor reaching a threshold strength, among other things. If the object of interest is now in view of the sensor 120, the vehicle 104 can stop tilting and the controller 202 (or other system) can use the object of interest, for example, as an input (e.g., a speed limit sign), add the object of interest to map data, or send data associated with the object of interest to other vehicles or a central control.

At 412, if the object of interest is still not in view and the vehicle 104 is empty, the controller can determine if the vehicle 104 has reached maximum tilt angle 1. As before, when the vehicle 104 is empty, the vehicle 104 may be able to tilt to a greater angle without concern for passenger comfort or cargo safety. As a result, the vehicle 104 may be free to tilt to the maximum angle provided by the suspension control system 200, for example, or the maximum angle as dictated by the body of the vehicle 104 hitting the ground or the tires 108, among other things. In this manner, the vehicle 104 may be able to provide a greater change in the effective field of view of the sensor 120, which can enable it to bring taller, higher, shorter, or lower objects of interest into view.

At 414, If the vehicle 104 has reached maximum tilt angle 1, the suspension control system 200 may be unable to bring the object of interest sufficiently into view. In this case, the controller 202 may send a data request to central control. In some examples, the controller 202 may simply request map data, or other data, related to the object of interest. In other examples, such as when a navigational object is involved, the data request can include a teleoperation request requesting a worker to manually operate the vehicle 104 temporarily due to the inability to identify the object of interest.

At 416, the controller 202 may also save and/or send the information (e.g. sensor data) that is available from the portion (if any) of the object of interest that is within the field of view of the sensor 120. The controller 202 may send an image to a central control, for example, for review by a worker. The worker may be able to tell that the object of interest is a traffic sign, for example, from just a tip of the sign or identify a street name though the letters are partially cut off.

In some cases, the data request can simply say, for example, "There is something at these global positioning system (GPS) coordinates, but I cannot tell what it is." The central control may then be able to identify the object of interest based on sensor date from one or more other vehicles (e.g., vehicle in the vicinity of the vehicle 104 but with a different or better vantage point—e.g., in front or behind the vehicle 104—relative to the object) or from existing map data. In some examples, the central control may dispatch specialized mapping vehicles with broader capabilities to identify and map the object of interest. In other examples, the vehicle 104 may be able to consult onboard or network map data that includes the object of interest, obviating the need for the vehicle 104 to "see" the object of interest directly.

Returning to 406, if the vehicle 104 is not yet at maximum tilt angle 1, the vehicle 104 can continue, or resume, tilting at tilt rate 1. This process can continue until either the object of interest is within the field of view of the sensor or the vehicle 104 has reached maximum tilt angle 1. If the object of interest is within the field of view of the sensor, the system 100 may take an image of the object of interest, for example, and save the information or send the information to the central control. If, on the other hand, the object of interest cannot be brought sufficiently into the field of view of the sensor, the system 100 can send a data request, for example. At 418, regardless of whether the object of interest is within the field of view of the sensor or the vehicle 104 has reached maximum tilt angle 1, at the conclusion of the method 400, the vehicle 104 can return to the normal ride height pose.

At 408, the method 400 is similar if the vehicle 104 is occupied (i.e., the vehicle 104 can begin to tilt), but, in some cases, the tilt rate, or tile rate 2, and/or the maximum tilt angle, or maximum tilt angle 2, can be smaller than tilt rate 1 and maximum tilt angle 1, respectively. As mentioned above, in some examples, the maximum tilt angles can be somewhat binary—occupied and unoccupied. In other examples, maximum tilt angle 2 can include a range of angles chosen based on the classification of the cargo, for example, or user preferences. Kids may think it is fun for the vehicle 104 to tilt to extreme angles, for example, while adults may be less comfortable with higher angles.

At 410, regardless of the tilt rate, the controller 202 can determine if the object of interest is now (sufficiently) in view of the sensor 120. This can include image recognition software being able to identify the object of interest in image data or the return signal to a RADAR or LIDAR sensor reaching a threshold strength, among other things. If the object of interest is now in view of the sensor 120, the vehicle 104 can stop tilting and the controller 202 (or other system) can use the object of interest, for example, as an input (e.g., a speed limit sign), add the object of interest to map data, or send data associated with the object of interest to other vehicles or a central control.

At 420, if the object of interest is still not in view and the vehicle 104 is empty, the controller can determine if the vehicle 104 has reached maximum tilt angle 2. As before, when the vehicle 104 is empty, the vehicle 104 may be able to tilt to a greater angle without concern for passenger comfort or cargo safety. As a result, in this case the vehicle 104 may tilt to a smaller angle than the maximum angle provided by the suspension control system 200, for example, to avoid upsetting passengers or toppling cargo. In this manner, the vehicle 104 can nonetheless provide a change in the effective field of view of the sensor 120, yet not disturb passengers or cargo in the vehicle 104.

At 414, If the vehicle 104 has reached maximum tilt angle 2, the suspension control system 200 may be unable to bring the object of interest sufficiently into view. In this case, the controller 202 may send a data request to central control. In some examples, the controller 202 may simply request map data, or other data, related to the object of interest. In other examples, such as when a navigational object is involved, the data request can include a teleoperation request requesting a worker to manually operate the vehicle 104 temporarily due to the inability to identify the object of interest.

At 416, the controller 202 may again save and/or send the information (e.g. sensor data) that is available from the portion (if any) of the object of interest that is within the field of view of the sensor 120. The controller 202 may send an image to a central control, for example, for review by a worker. The worker may be able to tell that the object of interest is a traffic sign, for example, from just a tip of the sign or identify a street name though the letters are partially cut off. At 418, regardless of whether the object of interest could be brought into the field of view of the sensor, the suspension control system 200 can return the vehicle 104 to the normal ride height pose.

Figure 4B:
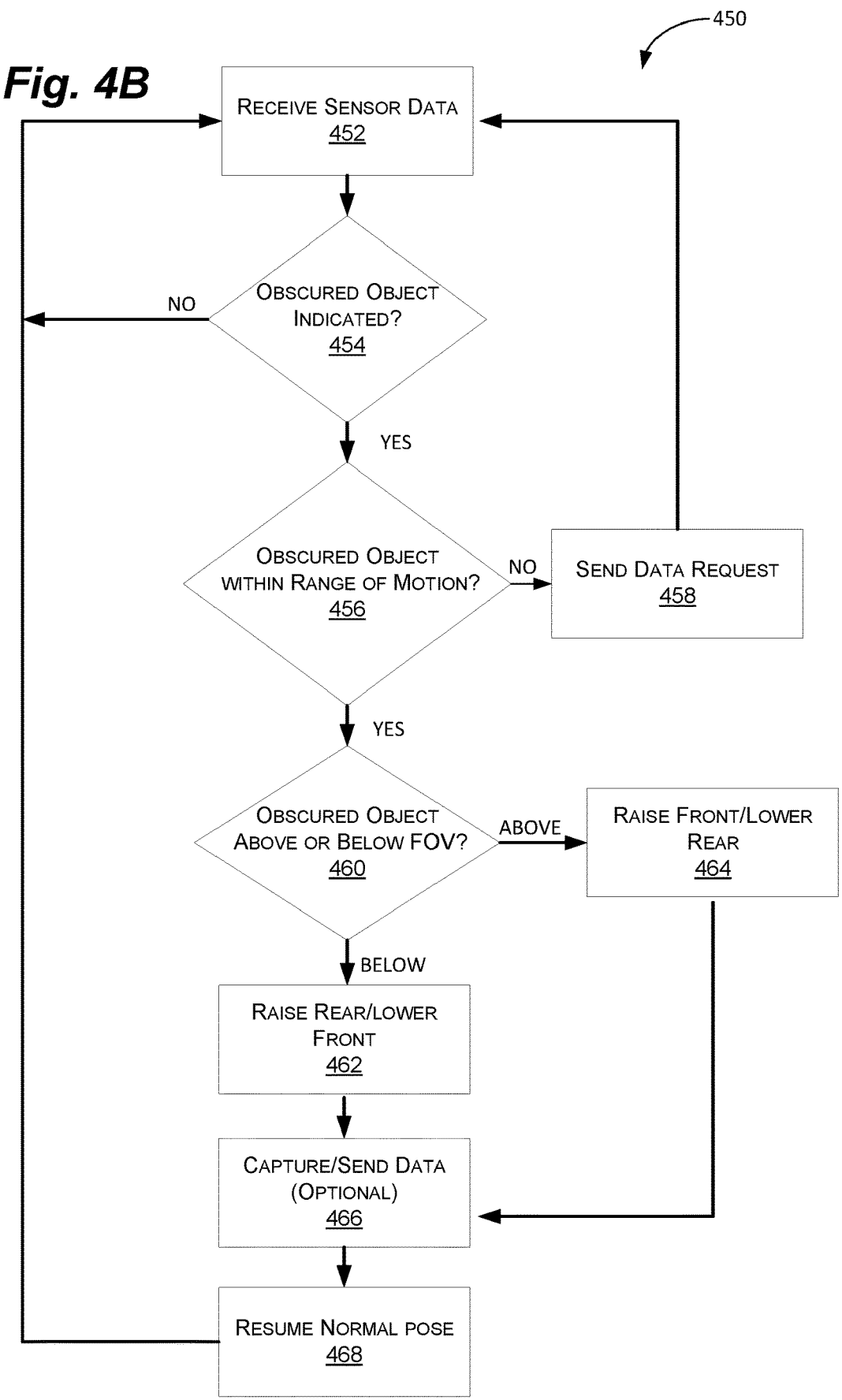
FIG. 4B is a flowchart depicting an example of another method for increasing the field of view of a sensor using a tilting vehicle suspension, in accordance with some examples of the present disclosure.

As shown in FIG. 4B, examples of the present disclosure can also comprise a method 450 for capturing image data for objects of interest outside the field of view of a sensor on the vehicle 104 when the vehicle is in the normal ride height pose. In other words, in some examples, an object of interest may be slightly, or totally, out of view of one or more sensors 120 on the vehicle 104 when the pose of the vehicle 104 is essentially level—e.g., the configuration of the vehicle 104 when simply driving down the road and operating normally. In some examples, an object of interest can be outside the field of view of a sensor in the standard ride height pose, but can be brought into view with the available suspension travel (i.e., the effective field of view).

For clarity and simplicity, the method 450 is discussed below as a method for bringing an object of interest into the field of view of a camera on the vehicle 104 by creating a larger effective field of view by tilting the vehicle 104. One of skill in the art will recognize, however, that the method 450 can be used any time an object of interest is partially, or completely, outside the field of view of a sensor 120. Thus, the method 450 could be used to bring the object of interested into the field of view of a LIDAR or RADAR sensor, or any other type of sensor.

At 452, the controller 202 can receive image data from one or more sensors 120 on the vehicle 104. In some examples, sensor data can comprise raw data from one or more cameras, RADAR sensors, LIDAR sensors, or other sensors used to build an image of the area 102 proximate to the vehicle 104. In some examples, sensor data can comprise data from an image processor (such as, but not limited to, computer vision algorithms including machine learning algorithms, such as, for example, artificial neural networks, etc.) indicating that an object of interest is outside the field of view of at least one sensor 120. Thus, an object may be outside the field of view of one sensor, but at least partially within the field of view of another sensor 120. Or, an object may be included in map data, but not "seen" by any of the sensors 120—e.g., there should be something there, but it is not detected by one or more sensors 120. In some examples, the image processor can indicate a direction for the object of interest (e.g., a compass heading) and a location for the object of interest (e.g., front, right, high; rear, right, low, etc.). In other examples, the image processor can provide an approximate 3-D coordinate for the object of interest.

At 454, the controller 202 or the image processor can determine if an object of interest is indicated in the sensor data. As mentioned above, this can be done using various data processing and classification techniques to identify and classify objects of interest. Various relevant techniques are discussed, for example, in U.S. patent application Ser. No. 14/932,940, filed Nov. 4, 2015, entitled, "Automated Extraction of Semantic Information to Enhance Incremental Mapping Modifications for Robotic Vehicles," which is hereby incorporated by reference.

At 456, the controller 202 can determine if the object of interest is within the range of motion of the system 100. In other words, while the vehicle 104 can tilt forward and backward, and left to right, it can only do so to the extent of the travel of the suspension control system 200. In other words, the shocks 210 can only lower to the point that they (or the suspension) "bottoms out" or reaches the top of its travel, for example, or the body hits the ground or tires. Thus, the ability to tilt the front of the vehicle 104 nose up is limited by the height to which the front shocks 210 (or front suspension) can be extended and the height to which rear shocks 210 (or the rear suspension) can be retracted, or lowered.

Thus, it is possible, for example, that the system 100 can "see" an object of interest with a RADAR sensor, for example, and would like to obtain more data using a high-definition camera. If the RADAR sensor is located on the roof of the vehicle 104 and the camera is mounted on the bumper, it is possible that the vehicle 104 simply cannot bring the object of interest in the field of view of the camera because at full tilt, the object of object of interest remains outside the effective field of view of the camera. Thus, while the effective field of view of the camera has been increase by the tilt angle $\alpha_3$, the object may nonetheless remain outside the field of view of the camera.

At 458, therefore, in some examples, the controller 202 can send a message to the central control indicating the presence of an object of interest that cannot be brought into the field of view of at least one sensor 120 on the vehicle 104. In this case, another vehicle 104 from a different direction or with a different configuration may be able to capture the desired images or data (e.g., an SUV may be able to see objects of interest in a higher location than a sedan). In other examples, when the central control has received a sufficient number of data requests in a particular area, the central control may dispatch a specialized mapping vehicle to the area that can capture the desired data.

At 460, if the object of interest is determined to be within the range of motion of the vehicle 104, on the other hand, the controller 202 can determine if the object of interest is above or below a particular sensor. In some examples, the controller 202 can receive 3-D coordinates from the image processor, for example, or can derive this information from the sensor data. In other examples, the controller 202 can compare the relative position of the object of interest as detected by one or more additional sensors 120. In other words, the object of interest may appear in multiple LIDAR or RADAR sensors, for example, which can enable the controller 202 to determine the position and/or orientation of the object of interest with respect to a camera.

At 462, if the object of interest is determined to be below the field of view of the camera, the controller 202 can raise the rear end of the vehicle (e.g., the second end 116) and lower the front end of the vehicle 104 (e.g., the first end 110). Of course, as mentioned above, what constitutes the front of the vehicle 104 and the rear of the vehicle 104 may be somewhat arbitrary in those examples where the vehicle 104 is a bidirectional vehicle, as it is dependent on the current direction of travel of the vehicle 104. This "nose down" pose (rear up/front down) enables the field of view of the camera to be lowered. Thus, while the camera may be fixed in a position where the field of view is symmetric about a line horizontal to the ground in the normal ride height pose (FIG. 1A), the camera can effectively be tilted down by tilting the vehicle 104 on its suspension control system 200. Tilting the vehicle 104 in this manner may be useful to tilt the camera down for potholes, road markings (e.g., lines, crosswalks, Botts' dots, etc.), and building addresses painted on the curb, among other things (collectively, "road features").

At 464, if the object of interest is determined to be above the field of view of the camera, on the other hand, the controller 202 can tilt the front of the vehicle 104 up and the rear of the vehicle 104 down (e.g., the "nose up" pose). This may be useful to bring traffic signs, street signs, traffic signals, and other high mounted objects of interest into the field of view of the camera. As a non-limiting example, tilting the vehicle 104 up may be useful in providing visibility to road signals (e.g. stop lights, street signs, etc.) at the top of a steeply inclined street. Thus, as shown in FIGS. 3A and 3B, the image processor or the controller 202 may detect the bottom edge of a traffic light 302, for example, partially within the field of view of the camera (or other sensor) and raise the front of the vehicle 104 and/or lower the rear of the vehicle 104 to bring the traffic light 302 (or a street sign mounted on top of the traffic light 302) fully into the field of view of the camera.

At 466, in some examples, the controller 202 may also save and/or send the information (e.g. sensor data) of the object of interest to a central control. The controller 202 may send an image, or other sensor data. to a central control, for example. Because the object of interest was successfully capture, the sensor data can be used to update map data, increase existing resolution, or the like.

At 468, when the desired data has been collected, the vehicle 104 can return to the normal ride height pose. Thus, the vehicle 104 may capture a high-resolution image of the traffic light 302, send this data to the central control, and then return to the normal ride height pose within a matter of seconds. Indeed, the vehicle 104 can be programmed to tilt up, capture an image, and tilt down in such a way (e.g., slowly and smoothly) that the passengers are substantially unaware of the movement.

Returning to 452, the controller 202 can return to receiving sensor data until another obscured object of interest is identified. Indeed, all of the vehicles 104 in an autonomous fleet, for example, can continuously gather data for mapping and navigation purposes. This can include adding features to existing maps to improve resolution, for example, or adding new or temporary features. The system 100 can identify new road signs, which may indicate the presence of a new subdivision, for example, before it appears on map data using other means (e.g., satellite imagery or mapping vehicles). The system 100 can also report traffic delays, construction, new traffic patterns, and more to continuously maintain the accuracy of mapping and improve travel efficiency.

Purely as an example, if the vehicle 104 has a relatively standard wheelbase of around 115 inches and the shocks 210 have 6 inches of total travel (e.g., 3 inches up and 3 inches down from the normal ride height pose), then the vehicle 104 can tilt the camera approximately 3 degrees. Depending on the distance between the object of interest and the camera, this can provide a significant increase in the effective field of view of the camera. Of course, a shorter wheelbase and/or more suspension travel would result in higher tilt angles, and vice-versa.

FIGS. 4A and 4B are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects of interest, components, data structures, and the like that perform particular functions or implement particular abstract data types. The order in which the operations are described is not intended to be construed as a limitation, and any number of the described blocks can be combined in any order and/or in parallel to implement the processes.

Figure 5:
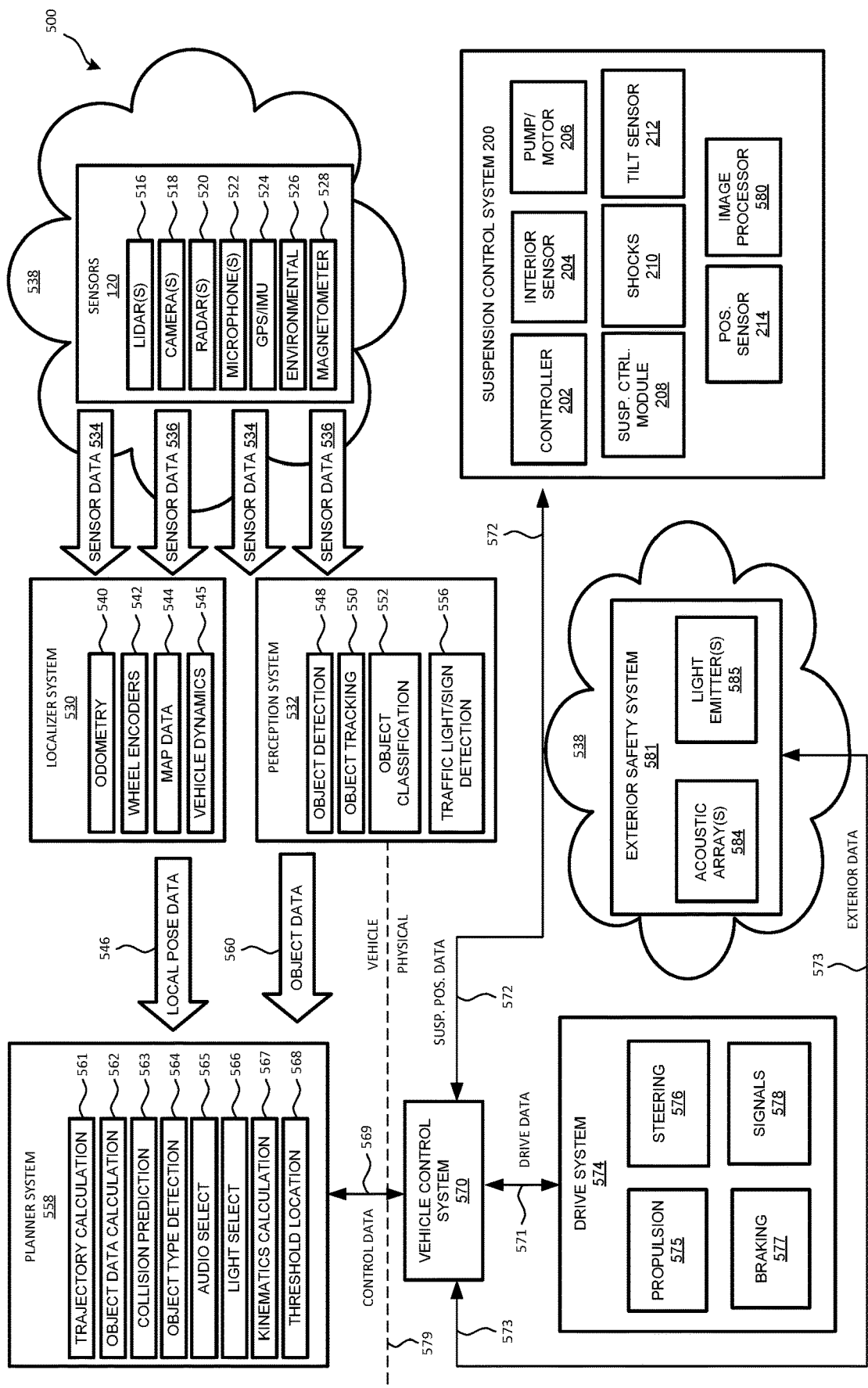
FIG. 5 is a block diagram of an example of a vehicle control system, in accordance with some examples of the present disclosure.

FIG. 5 is a block diagram of an illustrative operation control system 500 configured to control operations of the vehicle 104 including the suspension control system 200 and sensors 120. In various implementations, the operation control system 500 may be implemented using a uniprocessor system including one processor, or a multiprocessor system including several processors (e.g., two, four, eight, or another suitable number). In some implementations, the processor(s) can comprise a central processing unit (CPU), a graphics processing unit (GPU), or both a CPU and a GPU, or any other sort of processing unit. The processor(s) may be any suitable processor capable of executing instructions. For example, in various implementations, the processor(s) may be general-purpose or embedded processors implementing any of a variety of instruction set architectures (ISAs), such as the x86, Performance Optimization with Enhanced RISC—Performance Computing (PowerPC), Scalable Processor Architecture (SPARC), or Microprocessor without Interlocked Pipeline Stages (MIPS) instruction set architecture (ISA)s, or any other suitable ISA. In multiprocessor systems, each processor may commonly, but not necessarily, implement the same ISA.

The operation control system 500 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic random access memory (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid-state memory), magnetic or optical media (e.g., a disk) coupled to the operation control system 500 via an input/output (I/O) interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In one implementation, the I/O interface may be configured to coordinate I/O traffic between the processor(s), the non-transitory computer readable media, and any peripheral devices, the network interface or other peripheral interfaces, such as input/output devices. In some implementations, the I/O interface may perform any necessary protocol, timing or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example shown in FIG. 5, and mentioned above, the operation control system 500 includes the one or more sensors 120 including a plurality of sensors 516-528. The sensors 120 may include, for example, LIDAR 516, image capture sensors 518 (e.g., cameras or other imagers), RADAR 520, sound capture sensors 522 (e.g., microphones), GPS sensors, and/or inertial measurement unit sensors (IMU) 524. The IMU 524 can include, for example, one or more gyroscopes and/or accelerometers to measure the orientation and/or acceleration of the vehicle 104. The sensors 120 may also include one or more environmental sensors 526, such as, for example, one or more sensors for detecting ambient temperature, temperature of the road surface, humidity, and barometric pressure. The sensors 120 can also include one or more magnetometers (e.g., electronic compasses) 528 to measure the heading of the vehicle 104 (i.e., the vehicle's orientation with respect to magnetic north).

The operation control system 500 may also include a localizer system 530 and a perception system 532, each of which may receive location and environment sensor data 534 and/or object sensor data 536 from one or more of the sensors 120. For example, the localizer system 530 may receive location and environment sensor data 534 associated with the location of the vehicle 104 in the environment 538, such as from IMU 524. The perception system 532 may receive object sensor data 536 relevant to determine information associated with objects of interest in the environment 538 surrounding the vehicle 104, such as sensor data from LIDAR 516, image capture sensors 518, RADAR 520, environmental sensors 526, and/or sound capture sensors 522. In some examples, the localizer system 530 may receive data from sources other than the sensors 120, such as, for example, map data, map tile data, route data, route network definition file (RNDF) data, a data store, and/or a data repository. In some examples, the location and environment sensor data 534 received by the localizer system 530 may be identical (or at least similar to) the object sensor data 536 received by the perception system 532. In some examples, the sensor data 534, 536 received by the localizer system 530 may not be identical to the sensor data 534, 536 received by the perception system 532. The sensor data 534, 536 may each include data from any combination of one or more sensors 120 or sensor types. The amounts and types of sensor data 534, 536 may be independent from one another and/or may be similar or equivalent.

The localizer system 530 may receive and/or access data from sources other than sensor data 534, 536, such as, for example, odometer data 540 from motion sensors configured to estimate a change in position of the vehicle 104 over time, wheel encoders 542 configured to calculate motion, distance, and other metrics associated with the vehicle 104 based on the rotations of one or more of the wheels 106, map data 544 from data representing map tiles, route data, RNDF data, and/or other data, and data representing the model and/or type of vehicle corresponding to the vehicle 104, which may be used to calculate vehicle location data based on vehicle dynamics modeling 545 (e.g., from simulations, captured data, etc.) of the vehicle 104. The localizer system 530 may use one or more of the data resources indicated herein to generate data representing local position and orientation data (e.g., local pose data 546).

In some examples, the perception system 532 may analyze, process, and/or manipulate sensor data 534, 536 to implement object of interest detection 548 and/or an object of interest tracking 550. This can include differentiating between objects of interest that are static and objects of interest that are in motion. The object of interest tracking 550 can also track one or more moving objects of interest based on the movement of the object of interest in the environment 538. This can also include an object of interest classification 552 to identify the object of interest type—e.g., car, motorcycle, cyclist, pedestrian, empty box, trash, etc. The perception system 532 can also include a traffic light/sign detection 556 strategy (e.g., identifying traffic lights, stop signs, railroad crossings, lane markers, and pedestrian crosswalks). As mentioned above, the suspension control system 200 may receive data from the perception system 532, or may receive data directly from the sensors 120 for separate analysis—i.e., the needs of the suspension control system 200 may be the same as, or different than, the needs of the planner system 558 and other vehicle components.

In the example shown, the operation control system 500 also includes a planner system 558 configured to receive the local pose data 546 and object of interest data 560, and analyze the local pose data 546 and the object of interest data 560 to implement functions including, for example, a trajectory calculation 561, an object of interest data calculation 562, a collision prediction 563, an object of interest type detection 564, an audio signal selection 565, a light pattern selection 566, a kinematics calculation 567, and a threshold location estimation 568. The example planner system 558 may communicate trajectory and control data 569 to a vehicle control system 570 and/or the suspension control system 200. The vehicle control system 570 may be configured to process the control data 569 to generate and/or receive drive system data 571, suspension position data 572, and exterior safety system data 573. The drive system data 571 may be communicated to a drive system 574, and the drive system 574 may be configured to communicate the drive system data 571 to a propulsion system 575, a steering system 576, a braking system 577, and a signal system 578 (e.g., turn signals, brake signals, headlights, and/or running lights). For example, the drive system data 571 may include propulsion data (e.g., a voltage, current, or power signal for electric motors, and/or a throttle signal for internal combustion engines) for the propulsion system 575, steering angle data for the steering system 576 (e.g., a steering angle setting), and braking data for the braking system 577 (e.g., a deceleration rate to be achieved).

As mentioned above, the suspension control system 200 may receive data from the planner system 558 regarding, for example, the local pose data 546, object of interest data 560, trajectory calculation 561, and object of interest type detection 564 to create combined motions. In other words, the suspension control system 200 can use the natural movement of the vehicle 104 in transit in concert with the movement of the shocks 210, for example, to create larger, but smoother movements. This can enable the suspension control system 200 to create greater tilt angles and/or tilt rates, for example, without unduly disturbing passengers.

In some examples, the suspension control system 200 may also receive map data 544 to predict when a vehicle pose may be useful or necessary. If the map data 544 includes the location of a known pothole near an intersection, for example, the suspension control system 200 may combine the tilting effect of braking with a vehicle pose to locate and avoid the pothole. Thus, the suspension control system 200 determines ahead of time what pose is needed based on the information contained in the map data 544, among other things.

In the example shown in FIG. 5, a dashed line 579 represents a demarcation between a vehicle trajectory processing layer and a vehicle physical execution layer, where data processed in the vehicle trajectory processing layer is implemented by one or more of the suspension control system 200, drive system 574, and/or an exterior safety system 581. In some examples, one or more portions of the exterior safety system 581 may be configured to reduce impact force or other adverse effects of a collision.

As mentioned above, in some examples, the vehicle 104 can also include a suspension control system 200. For example, one or more portions of the suspension control system 200 may be configured to raise and lower portions of the vehicle 104 to enable the vehicle 104 to assume various poses (e.g., nose up, nose down, left, right, normal ride height, etc.). The suspension control system 200 can include the controller 202 and may also include items such as, for example, one or more interior sensors 204, the pump/motor 206, the suspension control module 208, shocks 210, tilt sensor 212, and positions sensors 214, as described in detail above. In some examples, some or all of these sensors 204, 212, 214 may also be used by the operation control system 500.

In some examples, the controller 202 can include built in logic and/or processors to enable the controller 202 to perform the aforementioned image processing to identify objects of interest. In other examples, the controller 202 can include, or can be in communication with, a separate image processor 580. The image processor 580 can include, for example, a central processing unit (CPU), a graphics processing unit (GPU), or both a CPU and a GPU, or any other sort of processing unit. In some examples, the image processor 580 can receive and interpret data from the sensors 120 to identify and locate objects of interest. As non-limiting examples, the image processor 580 may use bag of words, k-nearest neighbors, support vector machines, neural networks, and the like to name a few. In some examples, the controller 202 may receive object of interest data 560 from the perception system 532, such object of interest data 560 may comprise, for example, segmentations of objects from raw sensor data of the sensors 120 and corresponding object classifications.

The suspension control system 200 can also include one or more interior sensors 204, which can be used to detect and/or classify cargo in the vehicle 104. The interior sensors 204 can comprise, for example, a seat belt sensor, which can be a simple switch or sensor to detect when the seat belt has been fastened around passengers and/or cargo. The interior sensors 204 can also comprise, for example, a seat weight sensor to detect the weight of an object of interest in the seat. In some examples, the seat weight sensor can be a simple weight sensitive switch with a threshold weight. In this configuration, the seat weight sensor may simply be closed when a weight above a threshold weight (e.g., 70 lbs.) is in the seat and open when the weight in the seat is below this threshold (or vice-versa). In other examples, the seat weight sensor can comprise a strain gauge, or other weight sensor, capable of determining the actual weight of the object of interest or passenger in the seat. These interior sensors 204 can aid the controller 202 to determine if the vehicle 104 is occupied and/or to classify the cargo.

The interior sensors 204 can also include one or more interior imagers. The interior imagers may be any known types of digital image sensors, digital or analog cameras, and/or digital or analog video cameras. The interior imagers may be high dynamic range (HDR) cameras, for example, to provide improved accuracy of the images. In some examples, the interior imagers may include one or more of light-sensitive cameras, range sensors, tomography devices, RADAR, and/or ultra-sonic cameras. Other suitable types of imagers are contemplated. The interior imagers may be selected to provide two-dimensional image data, three-dimensional image data, image sequences, gray image data, and/or color image data. In some examples, the interior imagers may be selected to provide depth data, absorption data, and/or reflectance data. The interior imagers can be aimed at the interior space of the vehicle 104, for example, to provide the controller 202 with image data.

So, for example, if the seat belt sensor indicates the seat belt is buckled, the seat weight sensor indicates 135 lbs., it is likely that a passenger is in the vehicle 104. This can be further confirmed using image data from the interior imagers and image recognition software capable of identifying a human being. The interior sensors 204 can enable the controller 202 and other vehicle systems 500, 570 to distinguish between a 130-pound box, for example, and a 130-lb. passenger and adjust tilt rates and tilt angles accordingly.

Though not illustrated in FIG. 5 for clarity, in some examples, local pose data 546, as well as an output from a trajectory calculation 561 (e.g. a series of predicted vehicle poses, linear and/or angular velocities, linear and/or angular accelerations, etc. extending into the future from a current state) and/or control data 569 (e.g. commands sent to a vehicle to effectuate a trajectory) may be input into the controller 202 as motion data. In such examples, the controller 202 may use local pose data 546, as well as motion data, to increase a potential tilt angle or tilt rate.

As a non-limiting example, a vehicle (e.g. vehicle 104) naturally pitches forward about a center of gravity when coming to a stop. In such an example, if an object of interest lies below a field of view of a sensor 120 (e.g., a pothole), the controller 202 may account for the estimated pitch due to braking when adjusting the shocks 210, for example, to either increase the tilt angle, increase the tilt rate, reduce the movement perceived by a passenger, or reduce the energy expenditure to tilt the vehicle 104. Furthermore, in such an example, because the vehicle 104 is naturally pitching forward, slight additions to the pitch (either in total tilt angle and/or tilt rate) may be imperceptible to a passenger. By incorporating (or blending) such information into a control of the suspension, the controller 202 may achieve greater tilt angles and/or rates than would otherwise be acceptable to a passenger. This effect may also be exploited to tilt the vehicle 104 up when accelerating, side-to-side when turning, and combinations thereof to create diagonal, and other, motions.

The exterior safety system 581 may include systems, such as, for example, an acoustic array system 584 and a light emitter system 585. In some examples of the systems of the exterior safety system 581, the systems may be configured to interact with the environment 538 surrounding the vehicle 104, for example, by emitting a steered beam of acoustic energy into the environment 538 using one or more acoustic arrays, and/or by emitting light into the environment 538 using one or more light emitters of the light emitter system 585. The sound and/or light emitted may provide audible and/or visual warnings to objects of interest in the environment 538, such as other vehicles, pedestrians, and cyclists. In some examples, the acoustic arrays may emit acoustic energy into the environment 538 using, for example, transducers, air horns, or resonators. The acoustic energy may be omnidirectional, or may constitute a steered beam or focused sound (e.g., a sound emitted from a directional acoustic source, a phased array, a parametric array, a large radiator, and/or an ultrasonic source). Systems of the exterior safety system 581 may be positioned at one or more portions of the vehicle 104 configured to allow the systems to interact with the environment 538, such as a location associated with an external surface of the vehicle 104.

Figure 6:
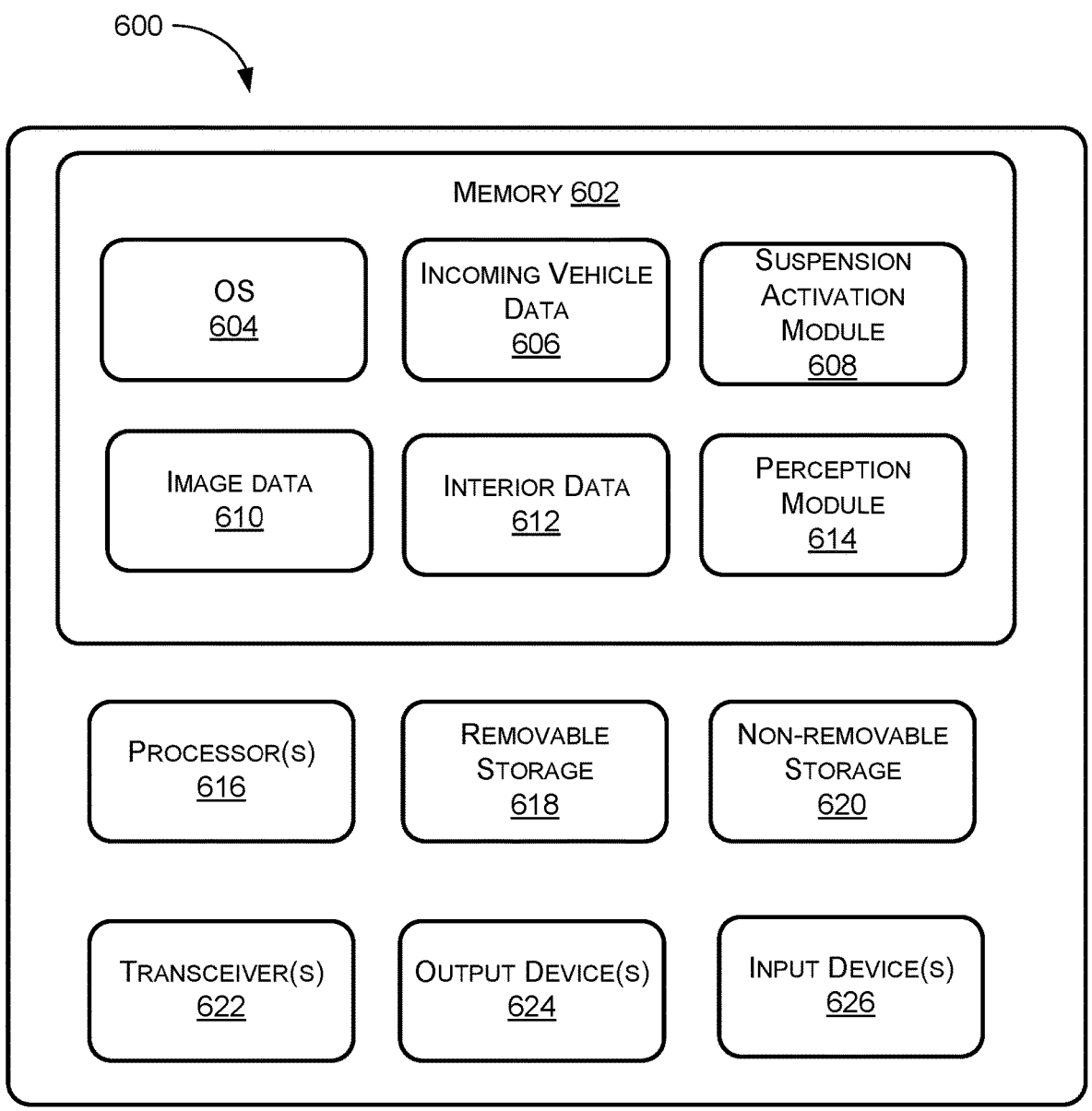
FIG. 6 is a block diagram of an example of vehicle computing device, in accordance with some examples of the present disclosure.

FIG. 6 is a component level schematic view of a vehicle computing device 600 for use with the system 100 such as, for example, the above-mentioned controller 202. The vehicle computing device 600 can comprise a component of the operation control system 500, the vehicle control system 570, or other electronic components for use with the systems 100, 200 and methods 400, 450 described herein. The vehicle computing device 600 can comprise a dedicated electronic device, such as a dedicated microcontroller, or can be a cell phone, smart phone, laptop, tablet, or other electronic devices that comprise a number of components to gather data, communicate, and maneuver, among other things, based on the data.

The vehicle computing device 600 can comprise memory 602 configured to include computer-executable instructions including at least an operating system (OS) 604 for receiving data and controlling the vehicle 104, among other things. The memory 602 can also include the ability to receive and store incoming vehicle data 606, a suspension activation module 608 in communication with the suspension control module 208, sensor data 610, interior data 612, and, in some cases, a perception module 614, which may be a component of, or separate from, the perception system 532. The vehicle computing device 600 can also include one or more processors 616, removable storage 618, non-removable storage 620, transceiver(s) 622, output device(s) 624, and input device(s) 626. Of course, in some examples, rather than being located in the vehicle computing device 600, the OS 604, perception module 614, and other functions, or portions thereof, can be located on a remote server at the central control or in another location.

In various implementations, the memory 602 can be volatile (such as random access memory, or RAM), non-volatile (such as read only memory, or ROM, flash memory, etc.), or some combination of the two. The memory 602 can also comprise the OS 604. The OS 604 can receive sensor data, provide passenger interfaces, and communicate with other vehicles or the central control, and perform other functions related to the various vehicle 104 systems 100, 200, 500.

The memory 602 can also store incoming vehicle data 606 from the vehicle's sensors 120 and, in some cases, from other vehicles. As discussed above, the incoming vehicle data can include video and still images, GPS coordinates, accelerometer readings, etc., from the various sensors (e.g., from the sensor system 512) on the vehicle 104. The incoming vehicle data can enable the vehicle computing device 600 to identify and locate objects of interest, for example; and, when appropriate, bring objects of interest into view of one or more sensors 120 using the suspension control system 200.

In some examples, the memory 602 can also include the suspension activation module 608. The suspension activation module 608 can enable the vehicle computing device 600 (e.g., the controller 202) to communicate with the suspension control module 208 and to directly, or indirectly, reposition the suspension control system 200. In some examples, the suspension activation module 608 can activate directly, or via the suspension control module 208, solenoids or motors that enable the shocks 210 to be moved up and down to assume various vehicle poses to bring objects of interest into (or further into) view of the one or more sensors 120.

In some examples, the memory 602 can also store sensor data 610 from one or more sensors 120. In some examples, the sensor data 610 can be used to determine when an object of interest is at least partially out of view of one or more of the sensors 120. In other examples, once the vehicle 104 has assumed a pose to bring an object of interest into view of the sensors 120, the sensor data 610 can include sensor data (e.g., image LIDAR, or RADAR data) from the one or more sensors 120 of the complete object of interest (or as close as can be obtained) to be sent to the central control for additional review. This can enable the central control to provide updated mapping data, for example, as discussed above.

In some examples, the memory 602 can also include interior data 612. Interior data 612 can include data from one or more interior sensors such as, for example, the aforementioned seat belt sensors, seat weight sensors, interior imagers, and other components. The interior data 612 can enable the vehicle computing device 600 to determine whether the vehicle 104 is occupied or not and, in some cases, a classification of an object inside the vehicle 104. This information can be used to set the vehicle tilt rates and tilt angles in addition to normal vehicle maneuvering parameters.

In some examples, the vehicle computing device 600 can also include the perception module 614. As mentioned above, the perception module 614 can be located on the controller 202, for example, in a separate component (e.g., systems 500, 570), or on a remote server. The perception module 614 can enable objects of interest to be identified in the sensor data 610. In some examples, even a small portion of an object of interest can enable it to be identified. A small portion of the side or bottom of a traffic light 302, for example, which merely depicts a red sign with a white border, could be used to identify the traffic light 302. Regardless of its location in the system, the perception module 614 can enable objects of interest to be identified, classified, and/or located in space. The perception process is discussed above in more detail with reference to the vehicle's perception system 532. Additional details of applicable perception systems can be found in U.S. patent application Ser. No. 14/932,940, filed Nov. 4, 2015, entitled "Automated Extraction of Semantic Information to Enhance Incremental Mapping Modifications for Robotic Vehicles," which is incorporated herein by reference.

In some implementations, the processor(s) 616 can comprise a central processing unit (CPU), a graphics processing unit (GPU), or both a CPU and a GPU, or any other sort of processing unit. The processor(s) 616 can be responsible for running software on the vehicle computing device 600, including the OS 604 and other modules, and to interpret and send messages to the central control, if applicable. In some examples, the processor(s) 616 can also perform calculations and provide instructions based on data from the sensor system 512, for example, and various input device(s) 626, discussed below.

The vehicle computing device 600 can also include additional data storage devices (removable and/or non-removable) such as, for example, magnetic disks, optical disks, or tape. Such additional storage is illustrated in FIG. 6 by removable storage 618 and non-removable storage 620. The removable storage 618 and non-removable storage 620 can store the various modules, programs, passenger interfaces, and algorithms for the OS 604 and other modules, among other things.

Non-transitory computer-readable media may include volatile and nonvolatile, removable and non-removable tangible, physical media implemented in technology for storage of information, such as computer readable instructions, data structures, program modules, or other data. The memory 602, removable storage 618, and non-removable storage 620 are all examples of non-transitory computer-readable media. Non-transitory computer-readable media include, but are not limited to, RAM, ROM, electronically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the vehicle computing device 600. Any such non-transitory computer-readable media may be part of the vehicle computing device 600 or may be a separate device (e.g., a jump drive) or a separate database or databank (e.g. at a central server).

In some implementations, the transceiver(s) 622 can include any sort of transceivers known in the art. The transceiver(s) 622 can include, for example, wireless modem(s) to facilitate wireless connectivity with the other vehicles, a central control (if applicable), remote server, the Internet, and/or an intranet. Further, the transceiver(s) 622 may include a radio transceiver that performs the function of transmitting and receiving radio frequency communications via an antenna (e.g., cellular, Wi-Fi, or Bluetooth®).

In some implementations, the output device(s) 624 can include any sort of output devices known in the art, such as the displays (e.g., a liquid crystal display (LCD), light emitting diode (LED) display, or thin film transistor (TFT) screen), a touchscreen display, lights, speakers, a vibrating mechanism, or a tactile feedback mechanism to provide interactive feedback to the passenger. In some examples, the output device(s) 624 can play various sounds related to whether the vehicle 104 is occupied or not, for example, or sounds intended to alert a passenger that the vehicle 104 is moving from one pose to another. Output device(s) 624 can also include ports for one or more peripheral devices, such as headphones, peripheral speakers, or a peripheral display to provide feedback to passengers, for example.

In various implementations, input device(s) 626 can include any sort of input devices known in the art. For example, input device(s) 626 may include a microphone, a keyboard/keypad/touchpad, a touch-sensitive display, a proximity sensor, gyroscope, accelerometer, altimeter, and other sensors. A keyboard/keypad may be a standard push button alphanumeric, multi-key keyboard (such as a conventional QWERTY keyboard), a touchscreen keyboard, or one or more other types of keys or buttons, and may also include a joystick, wheel, and/or designated navigation buttons, or the like. In some examples, the input device(s)

626 can also include communication ports to receive data from passengers, external sensors, or cameras, among other things.

As discussed above, in some examples, the systems 100, 200 may utilize data from passengers, for example, related to a preferred maximum tilt rate or tilt angle. Some passengers may enjoy the movement of the vehicle 104, for example, while other passengers may prefer the ride to be as smooth as possible. In other examples, the system 100 can comprise one or more input device(s) 626 mounted in the vehicle computing device 600 or connected to the vehicle computing device 600 during installation. In some examples, some of the input device(s) 626 can be housed in the vehicle computing device 600 and the rest of the input device(s) 626 can be installed on the vehicle 104 and connected to the vehicle computing device 600 (e.g., using a wired or wireless connection). This can enable some or all of the system 100 to be installed on vehicles 104 as an aftermarket installation.

While several possible examples are disclosed above, examples of the present disclosure are not so limited. For instance, while systems and methods for adjusting the suspension to increase sensor fields of view in autonomous vehicles are discussed, the system could also be used in semi-autonomous or manually operated vehicles without departing from the spirit of the disclosure. In addition, the location and configuration used for various features of examples of the present disclosure such as, for example, the order of steps, the components of the systems 100, 200 or vehicle computing device 600, and the locations of various components (e.g., the sensors 120, shocks 210, and other components) can be varied according to a particular vehicle 104, vehicle layout (e.g., sedan vs. sport utility vehicle (SUV)), or other component that requires a slight variation due to, for example, the size or construction of the vehicle 104, the passenger compartment, the operating area 102 of the vehicle 104, or the processing power of the vehicle computing device 600. Such changes are intended to be embraced within the scope of this disclosure.

The specific configurations and layouts of the systems 100, 200, vehicle 104, vehicle computing device 600, and other features, and the size, location, and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of protection afforded by this application is indicated by the appended claims, rather than the foregoing description, and all variations that come within the meaning and range of equivalents thereof are intended to be embraced therein.

What is claimed is:

1. A method comprising:
   receiving, at a controller, sensor data from one or more sensors on a vehicle, the vehicle having a first vehicle pose;
   receiving, at the controller, perception data indicating that the sensor data contains a first portion of an object of interest, the object of interest being at least partially outside a field of view of a sensor of the one or more sensors on the vehicle, the sensor having a fixed field of view relative to the vehicle;
   determining, with the controller, a second vehicle pose, such that in the second vehicle pose a second portion of the object of interest is within the field of view of the sensor, the second portion being different than the first portion;
   receiving additional perception data comprising an object classification of an interior object;
   determining, based at least in part on the object classification, one or more of a maximum tilt angle or maximum tilt rate of the vehicle; and
   sending, from the controller, a signal to a suspension controller to cause the vehicle to assume the second vehicle pose, wherein the signal comprises one or more instructions to constrain the second vehicle pose based at least in part on the maximum tilt angle or instructions to constrain motion of a suspension based at least in part on a maximum tilt rate.

2. The method of claim 1, wherein:
   the additional perception data indicates whether the vehicle is occupied;
   sending the signal to the suspension controller to cause the vehicle to assume the second vehicle pose causes the vehicle to assume the second vehicle pose at a first tilt rate if the vehicle is occupied and a second tilt rate if the vehicle is empty; and
   the first tilt rate is slower than the second tilt rate.

3. The method of claim 1, wherein:
   the additional perception data indicates whether the vehicle is occupied;
   a first angle is created between the first vehicle pose and the second vehicle pose if the vehicle is occupied and a second angle is created between the first vehicle pose and the second vehicle pose if the vehicle is empty; and
   the first angle is different than the second angle.

4. The method of claim 1, wherein receiving perception data indicating that the sensor data contains the first portion of the object of interest, the object of interest being at least partially outside the field of view of the sensor, comprises determining that the object of interest is below the field of view of the sensor; and
   wherein sending, from the controller, the signal to the suspension controller to cause the vehicle to assume the second vehicle pose comprises the controller sending a signal to the suspension controller to raise a trailing end of the vehicle or lower a leading end of the vehicle.

5. The method of claim 1 further comprising:
   receiving, at the controller, trajectory data, the trajectory data comprising predicted vehicle poses; and
   determining a control sequence, the control sequence configured to cause the suspension controller to move the vehicle into the second vehicle pose based, at least in part, on the trajectory data;
   wherein the signal comprises the control sequence.

6. The method of claim 1, wherein sending the signal to the suspension controller is configured to cause a suspension of the vehicle to tilt a body of the vehicle relative to a ground surface, thereby tilting the field of view of the sensor.

7. A vehicle comprising:
   one or more external sensors;
   a suspension control system, the suspension control system able to adjust a height of at least a portion of the vehicle to move the vehicle from a first vehicle pose to a second vehicle pose;
   a perception system to receive sensor data from at least a portion of the one or more external sensors and to identify an object;
   one or more transceivers configured to communicate wirelessly with one or more of other vehicles or a central control; and a controller, in communication with the perception system, the suspension control system, and the one or more transceivers, the controller configured to:
receive a first signal from the perception system indicating that the object is at least partially outside a field of view of a first external sensor of the one or more external sensors;
receive perception data comprising an object classification of an interior object;
determine, based at least in part on the object classification of the interior object, one or more of a maximum tilt angle or maximum tilt rate of the vehicle; and
send a first signal to the suspension control system to cause the vehicle to assume a second vehicle pose to bring the object into the field of view of the first external sensor, the second pose being different than the first pose;
wherein the signal comprises one or more instructions to constrain the vehicle pose based at least in part on the maximum tilt angle or instructions to constrain motion of a suspension based at least in part on a maximum tilt rate.

8. The vehicle of claim 7, the controller further configured to:
determine whether the object can be brought into an effective field of view of the first external sensor within a range of motion of the suspension control system;
wherein sending the first signal to the suspension control system is further based at least in part on the controller determining that the object can be brought into the effective field of view of the first external sensor within the range of motion of the suspension control system.

9. The vehicle of claim 7, wherein the first external sensor comprises a camera; and
wherein the perception system determines that at least a first portion of the object is outside the field of view of the camera based on sensor data from a second external sensor including a second portion of the object.

10. The vehicle of claim 7, wherein the one or more transceivers are further configured to receive map data, the map data indicating positions of objects in an environment; and
wherein the first signal is determined based at least in part on the map data.

11. The vehicle of claim 7, wherein the suspension control system independently controls at least a first suspension and a second suspension;
wherein the first suspension enables a first end of the vehicle of be moved up and down; and
wherein the second suspension enables a second end of the vehicle of be moved up and down.

12. A method comprising:
receiving, at a controller, sensor data from one or more sensors on a vehicle, the vehicle having a first pose;
determining, with the controller, that the sensor data contains an object that is at least partially outside a field of view of a sensor of the one or more sensors on the vehicle;
determining by the controller, that the object is an object of interest based at least in part on a trajectory of the vehicle;
sending, from the controller, a first signal to a suspension controller to cause the vehicle to assume a second pose based on the object of interest;
receiving, at the controller, updated sensor data from the one or more sensors;
determining, with the controller, that the sensor data contains the object of interest;
saving, to a memory associated with the controller, the sensor data associated with the object of interest; and
sending, from the controller, a signal to the suspension controller to cause the vehicle to return to the first pose based on the determination.

13. The method of claim 12, wherein:
determining, with the controller, that the sensor data contains an object that is at least partially outside a field of view comprises determining that the object is above the field of view of the sensor;
determining, with the controller, that the object is an object of interest comprises classifying the object as a navigational object; and
sending, from the controller, the first signal to the suspension controller to cause the vehicle to assume a first pose comprises sending a signal to the suspension controller to at least one of raise a suspension on a leading end of the vehicle or lower a suspension on a trailing end of vehicle.

14. The method of claim 13, wherein the navigational object comprises a traffic light.

15. The method of claim 13, further comprising:
determining, with the controller, that the suspension on the leading end, the suspension on the trailing end, or both are at a travel limit;
receiving, at a controller, updated sensor data from the one or more sensors on the vehicle;
determining, with the controller, that the sensor data indicates that the object of interest remains at least partially out of the field of view of the sensor;
sending, from the controller to a vehicle drive system, a second signal to cause the vehicle to stop; and
sending, from the controller to a central control, a data request requesting data from a central control in response to the determination,
wherein the object of interest is a necessary object.

16. The method of claim 15, wherein the data request comprises a request for teleoperation.

17. The method of claim 15, further comprising:
receiving, at the controller, a third signal from a teleoperation operator indicating that it is safe for the vehicle to proceed; and
sending a fourth signal, from the controller to the vehicle drive system, to move the vehicle.

18. The method of claim 13, wherein the first signal is sent until the vehicle reaches the second pose, the method further comprising:
receiving, at a controller, updated sensor data from the one or more sensors on the vehicle;
determining, with the controller, that the sensor data indicates that the object of interest remains at least partially out of the field of view of the sensor; and
sending an updated signal to the suspension controller to at least one of further lower the suspension on the leading end of the vehicle or further raise the suspension on the trailing end of the vehicle until the vehicle reaches a third pose;
wherein an angle formed between the first pose and the second pose is smaller than an angle formed between the first pose and the third pose.

19. The method of claim 12, further comprising:
receiving, at the controller, data from one or more interior sensors, the data indicating whether the vehicle is occupied;

wherein sending the signal to the suspension controller to cause the vehicle to assume the second pose causes the vehicle to assume the second pose at a first tilt rate if the vehicle is occupied and a second tilt rate if the vehicle is empty; and wherein the first tilt rate is slower than the second tilt rate.

20. The method of claim 12, further comprising:

receiving, at the controller, trajectory data, the trajectory data comprising predicted vehicle poses; and determining a control sequence, the control sequence configured to cause the suspension controller to move the vehicle into the second pose based, at least in part, on the trajectory data;

wherein the signal comprises the control sequence.

* * * * *